(12) United States Patent
Fisher

(10) Patent No.: US 6,957,199 B1
(45) Date of Patent: Oct. 18, 2005

(54) METHOD, SYSTEM AND SERVICE FOR CONDUCTING AUTHENTICATED BUSINESS TRANSACTIONS

(76) Inventor: Douglas Fisher, 1121 Bruckner Cir., Mountain View, CA (US) 94040

( * ) Notice: Subject to any disclaimer, the term of this patent is extended or adjusted under 35 U.S.C. 154(b) by 343 days.

(21) Appl. No.: 09/875,088

(22) Filed: Jun. 5, 2001

Related U.S. Application Data

(60) Provisional application No. 60/229,368, filed on Aug. 30, 2000.

(51) Int. Cl.[7] .............................................. G06F 17/60
(52) U.S. Cl. .......................... 705/78; 705/80; 705/64; 705/65; 705/67; 705/70; 705/71; 705/75; 705/53; 705/50; 713/155; 713/156
(58) Field of Search .................... 705/50–80; 713/155, 713/156

(56) References Cited

U.S. PATENT DOCUMENTS

| | | | | |
|---|---|---|---|---|
| 5,812,670 | A | * | 9/1998 | Micali .......................... 705/74 |
| 5,815,665 | A | * | 9/1998 | Teper et al. ................. 709/229 |
| 5,850,442 | A | | 12/1998 | Muftic |
| 6,404,337 | B1 | * | 6/2002 | Van Till et al. ............. 340/569 |
| 6,598,027 | B1 | * | 7/2003 | Breen et al. .................... 705/26 |
| 2003/0004894 | A1 | * | 1/2003 | Rowney et al. ............... 705/64 |
| 2003/0095726 | A1 | * | 5/2003 | Kia et al. .................... 382/313 |
| 2004/0128257 | A1 | * | 7/2004 | Okamoto et al. ............. 705/66 |

FOREIGN PATENT DOCUMENTS

| | | | | |
|---|---|---|---|---|
| WO | WO 99/66436 | * | 12/1999 | ........... G06F 17/60 |

OTHER PUBLICATIONS

"Software Smart Cards via Crypotographic Camouflage", Hoover et al., 1999 IEEE.*

Protecting Digital Identities, Arcot Webfort Whitepaper, Arcot Systems, Inc., downloaded from "www.arcot.com", Aug. 3, 2000.

Hoover, D.,N, and Kausik, B.,N., "Software Smart Cards via Cryptographic Camouflage", Proceedings of the 1999 IEEE Symposium on Security and Privacy, 1999, IEEE.

Hewlett Packard, "Enabling New Business Opportunities— A Primer on E-Speak", Downloaded from "www.hp.com/e-speak" on Aug. 1, 2000.

Tidepoint-Business Partner Infrastructure Services. Downloaded from "www.tidepoint.net" on Jan. 26, 2001.

* cited by examiner

*Primary Examiner*—James P. Trammell
*Assistant Examiner*—Jalatee Worjloh
(74) *Attorney, Agent, or Firm*—Foothill Group, LLP; Howard E. Lebowitz; Barton A. Smith

(57) ABSTRACT

The invention pertains to a method, online service, and system, for creating partnerships based on trust relationships over a public network, authenticating trade partners, infrastructure providers and collaborators to each other, and providing users with an environment suitable for conducting transactions requiring a high level of trust. A service according to the invention is a persistent authentication and mediation service (PAMS) which is provided as an on-line service. One embodiment is a method for conducting authenticated business transactions involving microprocessor equipped devices over the Internet comprising:

A. providing an on-line authentication service available on the distributed network;
B. authenticating a plurality of users to said on-line authentication service using a closed authentication system to produce a plurality of authenticated users; and
C. connecting a group of at least two of said plurality of authenticated users under persistent mediation of said on-line authentication service, producing a connected group of authenticated users.

29 Claims, 15 Drawing Sheets

A = Registration, B= Authentication, Discovery and Relationship Development, C= Collaboration

Manage Personas (Draft)

[Manage Existing Personas | Edit non-validated info | Create New Persona]

Existing Personas
- Trading
- Personal
- Anonymous
- One time relationship
- Long term relationship Enter name of new persona

Authenticated Business Info

| Type | Value |
|---|---|
| Business Name | ABC Corp |
| Address | 123 Park Ave |
| SIC Code | 56789 |
| Telephone # | 345-6789 |
| eMail address | you@here.com |
| Description | light bulbs |
| Service | Installation |

Authenticated Employee Info

| Type | Value |
|---|---|
| Name | Paul Smith |
| Commit Amt | $500,000 |
| Title | VP Purchasing |
| Phone number | 123-4567 |

Non - Authenticated Information

| Type | Value |
|---|---|
| Interests | electricity |
| Purchase need | glass |
| Selling | light bulbs |
| Personal info | love to ski |

Select

Fig. 12

METHOD, SYSTEM AND SERVICE FOR CONDUCTING AUTHENTICATED BUSINESS TRANSACTIONS

This application claims the benefit of my Provisional Patent Application No. 60/229,368 filed Aug. 30, 2000 and specifically references PTO Disclosure Document No. SV01257 which was filed on Jun. 11, 2000 and PTO Disclosure Document No. SV01343 which was filed on Jan. 17, 2001.

BACKGROUND OF THE INVENTION

1. Field of the Invention

The invention relates to a system and method for conducting authenticated business transactions over an open multi-platform public network.

2. Description of the Prior Art

The formation of the World Trade Organization and the general reduction in barriers to trade often referred to—as globalization, which has taken place in the past decade, has resulted in a great expansion of international global trade. Global trade requires a special infrastructure to support transactions. Differences in customs, legal systems, language and currencies increase the complexity and risk of conducting business internationally. Global trading partners often mitigate the risks by engaging banks to intermediate transactions. Trading partners are willing to pay a significant fee of approximately 1% of the goods value to banks in exchange for reducing trading risk by substituting the creditworthiness of the bank for the buyer. Another way to mitigate global risks and avoid large bank fees is through leveraging strong relationships between trading partners. In this method, the buyer and seller have established a trusted relationship prior to the transaction, which gives the seller enough confidence to ship the goods subject to later collection, usually upon invoice. The ability to leverage trusted long term relationships is certainly advantageous, but is becoming increasing difficult, especially over the Internet. Global traders looking to quickly establish new trading relationships to increase sales or to reduce costs must either go through a time consuming process to develop the relationship over time, or incur a risk since verifying the identity of the trading partner in another country is difficult. In any event, the ability to quickly form trusted business relationships is becoming mission critical and central to this capability is the ability to globally ensure the identity of each trading partner.

The development of the public Internet and a multiplicity of e-businesses and electronic marketplaces (e-markets) are providing potential counterparts with the theoretical possibility to meet each other and conduct efficient real time trade on a global basis. Electronic commerce has already demonstrated its ability to add efficiency to markets by real time brokering of goods and services in the consumer arena. In the current consumer applications, authentication, payment and credit are generally handled by a simple user-id/password approach for identification and credit card or off-line arrangement for payment. Most business applications also use user-id/password for authentication. This level of authentication, alone, is not sufficient to satisfy the needs for large world wide e-commerce markets.

An alternative and more certain approach to authentication than user-id/password is the use of public key infrastructure (PKI). PKI involves distributing a public key and a private key to users. A message encrypted with the private key can be decrypted with the public key. A common way of using PKI for authentication is to distribute the public key along with a message encrypted by the users private key. The validity of the public key is assured by distributing it in the form of a certificate which has been signed with the private key of a trusted certifying agent. The certificate can be verified using the well known public key of the certifying agent, and the user's public key can be used to decrypt the original message to authenticate the user by verifying that the message was encrypted using the user's private key.

The security of PKI is totally dependent on the security of the private key which is often protected by a hardware key such as a smart card to assure its security. Such systems are quite effective for authentication within a limited enterprise, but are impractical for authentication among a great many users as in global trade, because of the cost and complexity of managing the hardware keys on a large scale. Another drawback of such a system is that there is no effective way to deal with a major breach of security without notifying users of the system, since certificates are self-authenticating.

Another technique known as software camouflaging has been developed by Arcot Systems Inc. and has been described the paper "Software Smart Cards via Cryptographic Camouflage" by D. Hoover and N. Kausik (1999 IEEE Symposium on Security and Privacy") which similar to the hardware PKI described above solves some of the objections to PKI. The Arcot technique protects the private key by means of a cryptographic camouflage, which provides similar security benefits to hardware based PKI for closed public-key infrastructure, where messages are only verified by pre-defined trusted entities. This restriction occurs since the method requires that the user's public key be distributed on a certificate in an encrypted form which can only be decrypted by a secret key. The software camouflaging technique is more readily scaled to large numbers of users and curing breach of security is less of an issue since authentication is only handled by a limited number of servers. No means is provided, however, for non-trusted entities to accomplish validation. For this reason the technique could be called pseudo PKI.

The current generation of e-commerce applications is directed towards establishing authentication of clients to a particular Internet based services, i.e. connecting a user to a particular Internet based business with which the user is aware and where the user establishes an identification relationship of some type prior to transacting business. Authentication is carried out by each business, by some suitable means whereby he can recognize a person who has previously established a relationship. Several models have become popular. In one simple model, the user knows the URL address of an e-business and contacts the business. The user and business establish a relationship according to a protocol established by the business and thereafter the user authenticates himself according to the protocol, often entering a user name and password which are compared to values stored in a database on the business' server. In another common model the user is directed to a choice of businesses by a portal, whereupon the experience is similar to previous model. Still another class of e-businesses follow the structure of an exchange, where the exchange business establishes relationships with potential buyers and sellers who offer to buy or sell goods or services, such offers being matched in some way—by the exchange. In the exchange model, the actual transaction is usually consummated (payment, shipping, other infra-structure) outside of the exchange directly between the buyer and seller. In all of these models authentication is handled ad hoc according to the protocol set up by the Internet business owner, and in the case of the exchange possibly multiple times by the principals themselves.

One advanced model that has been proposed for providing world wide web service provider sites to consumers is that proposed in U.S. Pat. No. 5,815,665. In that patent an online brokering service is proposed which provides user authentication and billing services to allow consumer users to anonymously and securely purchase online services from service provider sites (e.g., World Wide Web sites) over a distributed public network. The user is authenticated by a returning a response to a challenge generated by the brokering service which is encrypted with the user's password. The brokering service authenticates the user by decrypting the response using the broker's copy of the password which it has on file. The user's anonymity and billing security are protected because they are held only by the broker rather than being distributed among a variety of service providers. The broker keeps each user's access rights to each service provider on record and provides these to the service provider at each session. Service providers generate a billing event message for each service utilized by the user and independently sends each billing event message to the brokering service. The brokering service bills the consumer for services used. While providing an important improvement to the art, U.S. Pat. No. 5,815,665 has a number of deficiencies which limit its use for promoting global trade transactions. First, the degree of authentication is limited to the security of a password, and the password is stored along with the identity of the consumer on the brokering services database. Second, the service is asymmetric. It is fundamentally based on interaction between two unequal parties, a service provider and a user interacting in a particular way which is defined by the nature of the service provider's web site application. There are no extensions to allow for the two parties to interact and forge a unique deal. Of particular importance in this regard, is that brokering service does not independently mediate the interaction between the user and the service provider but must rely on the report of the user's activities provided by the service provider through the billing event messages, thus allowing for disagreements or repudiation between the user and service provider. Also, there is no provision for the users of the multiple service providers to interact.

Another model of authentication involves providing infrastructure for existing business partners to securely share their information and computational resources among partners and allocate access among different users. These systems may provide limited access to users over a public network such as the Internet, but often involve the use of special network hardware for full access or a VPN. These systems are only available for users with a preexisting relationship and do not provide a method for forming a secure trust relationship over a public network. They do not provide a method to simultaneously connect arbitrary combinations of users.

The established models do not make optimal use of the Internet to promote global trade. First they leave the users to establish a multiplicity of relationships with different trade partners. The user has to know of the existence of the business and establish a relationship of trust and a basis for future authentication on an ad hoc basis. Also the type of transaction which can take place directly over the Internet is limited to simple transactions which are carried out in the predetermined format determined by the business owner, since the only relationship which has been established is between the user and the business and between the business and certain pre-determined infrastructure providers which have been chosen. This limitation precludes e-commerce transactions which are much more complicated than the standard models which were previously described. For instance, there is no way to make a deal for purchase of a commodity on the sellers Internet business site, and then "shop around" for infrastructure such as financing, shipping, and insurance specific to the unique deal between the buyer and seller. An even more desirable capability which cannot be currently implemented would be for a buyer along with a key partner on another computer to simultaneously shop around to purchase infrastructure from a variety of vendor-infrastructure provider combinations to optimize a particular procurement. It will be readily apparent that the Internet would be ideal for such optimized purchases if there was a way for appropriate trade partners and infrastructure providers to meet and reliably authenticate their identities.

There is a need for an improved authentication system, service and method with the security advantages of hardware smart card PKI which can be practically applied on a very large scale, even on a global basis, over the public Internet so that potential trade partners can reliably locate each other, authenticate each others' identity with great confidence, and establish trusted relationships over the Internet.

There is a need for an improved authentication system, service and method which provides an authenticated environment for collaboration between trade partners of different types on an equal basis to formulate complex business transactions.

There is a need for an improved authentication system, service and methods which provides for collaboration between business partners in an authenticated environment mediated by a third party so as to prevent repudiation of the collaboration.

SUMMARY OF THE INVENTION

The instant invention pertains to a method, an online service, and a system, for creating trade partnerships based on trust relationships over a public network, reliably authenticating trade partners, infrastructure providers and collaborators to each other over a distributed network such as the public Internet and providing authenticated users with an environment suitable for conducting business transactions requiring a high level of trust, particularly in world wide trade. The invention addresses the problems of establishing trusted relationships among widely separated and disparate parties which do not necessarily have a preexisting relationship, and providing an environment suitable for forming relationships and carrying out business transactions in a non-repudiation environment. The service acts as a trust broker by providing a unique mechanism for creating, monitoring, and enforcing trust relationships in business transactions involving a network accessed by micro processor equipped devices.

The invention pertains to a persistent authentication and mediation service (PAMS) which is provided as an on-line service on a public distributed network such as the Internet. As used herein, a PAMS is an online service provided over the network which is capable of authenticating groups of two or more users to each other by authenticating each user to the PAMS and connecting the authenticated users to each other under persistent mediation of the PAMS. Authentication refers to the processes of a first entity proving its identity to one or more other entities over the network. Mediation refers to the fact that communications between authenticated users pass through the PAMS giving the PAMS the capability to monitor the interaction and compile an audit trail. Persistent refers to the fact that interaction remains mediated during the entire interaction under the PAMS, and messages persist until delivered. Persistent messaging is based on asynchronous communication. The audit trail is compiled by monitoring mediated messages and saving pre-selected or user selectable messages for permanent storage and retrieval. The content of messages may be stored and retrieved.

Authentication of a user to PAMS according to the invention is accomplished by a "closed" authentication system, that is one where a prior relationship is required between the user and the authenticating party. The preferable closed authentication system is a closed PKI system, one where the PKI Certification Authority (CA) performs the authentication. The overall operation of the PAMS, however, serves as an "open" authentication system, that is one where the users do not need to have a direct prior relationship, but have trust in each others authenticity based on the authentication of the other to the PAMS and their connection to each other under persistent mediation of PAMS.

One embodiment of the invention is a process for conducting authenticated transactions among users employing microprocessor equipped devices over a distributed public network such as the Internet. The method involves providing a persistent authentication and mediation service (PAMS) on the network which carries out the following acts:

1. enrolling users—this step includes distributing software to each user which enables the user to authenticate to the persistent authentication and mediation service, generating and distributing a private key and digital certificate including a public key to the user in the form of a software smart card, obtaining credentials particular to the user, verifying the validity of the credentials, and storing the credentials in a customer database. Examples of users includes the type which accesses the Internet through an Internet Service Provider using a browser. A second type of user uses the persistent authentication and mediation service to control access to a web site or other application, that is accessible to the network without a browser interface. A third type of user could be a network accessible automated software application.

2. authenticating enrolled users to the PAMS using a Public Key Infrastructure (PKI) system which is consistent with storage of the private key and digital certificate in the form of a software protected smart card—this step includes the persistent authentication and mediation service generating a challenge message and sending it to the user seeking to be authenticated, receiving a response generated by the software which was provided to the user which includes an encrypted message and a digital certificate containing the user's public key, decrypting the response using the user's public key, verifying whether the response is authentic and rejecting the user if the response is not authentic. A preferred PKI system is a pseudo-PKI system where the private key is protected by cryptographic software camouflage and the public key is encrypted on a digital certificate by a key which is controlled by the persistent authentication and mediation service.

3. receiving requests from authenticated users to be connected to particular other users.

4. connecting groups of authenticated users under persistent mediation of the persistent authentication and mediation service—groups may include two or more users, and may include users of the same or different types.

5. mediating the interaction among connected users, including supplying authenticated information about each user to the interaction, and optionally removing the identifying information which is normally provided by the distributed network, directly compiling an audit trail of the interaction, and making application level information from the audit trail available to the connected users.

6. providing collaboration functionality to each group of interacting users to facilitate interaction between the users—the collaboration functionality includes a portal for browser users including a message board for posting messages among the authenticated collaborating users, and providing the users with access to the audit trail. Equivalent functionality is provided to transfer the authenticated exchange without a user interface for users not using a browser. The collaboration functionality preferably includes tools needed to exchange digitally signed documents attesting to their agreement.

The method embodied by the persistent authentication and mediation service provides the major elements of trust required for conducting trade over a network such as the Internet, wherein trust in the service is substituted for trust in the other party, including:

1. establishing a user's identity and having a trusted party (the PAMS) verify the identity,
2. providing the ability of authenticating the user to others and having others authenticate themselves to the user on line with a high level of confidence and trust based on their trust in the PAMS and persistent mediation of the PAMS during the interaction,
3. providing the ability for users to discover appropriate trade partners based on both their permanent verified credentials and dynamically variable and searchable information, such as a "shopping list" or a current inventory list,
4. providing the ability for anonymous but authenticated introductions among users with only the desired verified information coming with the introduction and without the identifying information which normally accompanies a transaction over a network,
5. providing the ability for two or more users to conduct an interaction which is mediated by the service so that a non-repudiation environment is established,
6. providing a level of abstraction to users which is not tied to a particular URL or address—the PAMS allows authenticated users to locate other enrolled users by criteria and to establish connection with symmetric authentication and providing ability for dynamic changes in membership, and
7. providing a "persistent environment" which allows users to shut down and restart their network presence in the same or different location with out losing their relationships.

Authentication provided by the PAMS differs from prior art methods which provide for a population of otherwise unrelated members to authenticate to each other. Authentication by the PAMS is a two step process involving first authenticating the users to the PAMS and then connecting authenticated users to each other under persistent mediation of the PAMS. Authentication of a large and disparate group of users to a single authenticating entity to whom they are known, can be done with a much higher level of confidence and trust than direct authentication of the many users to each other. A PAMS according to the invention, provides a way to provide the security possible in the many-to-one authentication while achieving the end results of many-to-many authentication. In the two step authentication process, users maintain the high level of confidence that they have in authentication to the PAMS when they are connected to each other under mediation of the PAMS, based on their trust in the PAMS. Thus the PAMS provides the high level of confidence which is associated with authentication to a single authenticating entity, to the situation where many users need to authenticate to each other. The PAMS provides symmetric authentication of users to each other, as opposed to one way authentication of a user to a service or server. The PAMS provides for authentication of multiple parties to each other. Since all interactions between users is mediated by the PAMS, interactions may be anonymous while still being authenticated. Anonymous transactions are conducted by referencing the identity rather than revealing it. Verified information about authenticated users can be exchanged without revealing the actual identity of the users to each other. The combination of authentication with mediation allows for user management of privacy and negotiation between parties on what will be revealed. This latter feature is important for the early stages of establishing a trusted relationship.

A mediated interaction has an audit trail which is maintained under the control of the PAMS, but is available to the users. An important feature of an interaction under the PAMS is that users, including users of different types, interact under circumstances where after their identity is authenticated by the PAMS and they are connected to other users under mediation of the PAMS, the interaction continues to be mediated by the PAMS during the interaction, so that an audit trail is accumulated. The audit trail is available to the users during the interaction. Another key feature is that groups of three or more users may interact. The mediated environment is a key part of establishing trust in the identity of the parties during the authentication process and is the basis for monitoring and enforcing trust during and after the transaction.

Since all transactions utilizing the PAMS are mediated and monitored at an application level, it is possible to accumulate an independent rating of users based on performance as monitored by the service. For instance, number of relationships a user or business has, number of deals conducted, dollar value of deals, reliability in responding to requests, response time to responding to requests, etc. This information could be used in by a business to monitor performance of employees or by an authentication insurance provider to rate the risk associated with insuring transactions of a particular business or user or by a member in deciding whether to form a trusted relationship with another member.

A preferred implementation of the invention utilizes two new classes of network software which are particularly and synergistically suited for providing the PAMS. A preferred implementation comprises a host site connected to the network, the host site including at least one computer server operated by an open software platform providing intelligent interactions, a persistent authentication and mediation service comprising a strong software pseudo PKI authentication agent operating on the open software platform, an audit agent operating on the open software platform for compiling an audit trail of mediated interactions and application software operating on the open software platform with functionality for enrolling users, authenticating enrolled users, allowing authenticated users to dynamically find suitable partners according to criteria which they specify, allowing authenticated partners to interact under the mediation of the persistent authentication and mediation service through the open software platform, and allowing members access to the audit trail at the application level, including access to the content of the interaction. The authentication system further comprises a customer database server comprising a database of information about the registered businesses, the database being accessible to the persistent authentication and mediation service.

In the context of this application, an open software platform refers to a platform where users and enabled services operating under the platform can interact regardless of their hardware or operating systems, system management strategies, development environments or device capabilities. Intelligent interaction refers to the ability of enabled services to discover, negotiate, mediate, and compose themselves into more complicated services. A preferred open software platform is Hewlett Packard's e-Speak, currently available as version 3.01. The e-Speak platform is implemented by an e-Speak core program which operates on a user's computer or server. In e-Speak, enabled services are referred to as e-Services. The ability to discover refers to the fact that when an e-service registers with a host system accessible to the Internet and creates a description of the service it provides, users of the system can automatically discover services which have desired attributes, and contact them without needing to have known about the service in advance or knowing its URL. To negotiate refers to the fact that e-Speak negotiates between the requester and provider to eliminate services which are outside of the requested criteria. To mediate refers to the fact that users are connected through the e-Speak core and e-speak continuously intermediates the service delivery after the user and e-service have been connected. The mediation is persistent in that an asynchronous message transfer system is provided to retain messages until delivered. While E-Speak mediates all interactions, it does not create a permanent audit trail by saving the interactions after delivery. The audit function of PAMS is an application running on e-Speak called the audit agent. An audit trail may include the content of an interaction. The audit agent intercepts specified events or messages during mediation based on application level monitoring, and stores them in a database. To compose refers to the ability of e-services to combine themselves into more complex, cascading e-services even dynamically.

E-Speak is in essence an "operating system" for building e-services operating on the platform. An open software source is provided to build business applications. The e-Speak platform does not provide for sufficient security since there is no way provided to protect the user private keys. Also e-Speak is intended for services to interact and transact without being centrally managed or provided. Central to the original intent of e-Speak, is that a service which is registered according to a known vocabulary, is instantly discoverable to another party through the dynamic discovery feature. A persistent authentication and mediation service according to the invention, requires all users to register with the PAMS to become part of a closed community. The PAMS is antithetical to the original intent of the open software platform and uses it in a fundamentally different manner than intended.

A preferred technology for software protected pseudo PKI is a system such as the pseudo PKI system described in U.S. Pat. No. 6,170,058, "Method and Apparatus for Secure Cryptographic Key Storage, Certification and Use", and "Software Smart Cards via Cryptographic Camouflage" by D. Hoover and N. Kausik (1999 IEEE Symposium on Security and Privacy"). The above technique protects the private key by means of a cryptographic software camouflage, which provides similar security benefits to hardware based PKI but is limited to circumstances where messages are only verified by pre-defined trusted entities. This restriction occurs since the method requires that to maintain security of the private key, the user's public key be distributed on a certificate in an encrypted form which can only be decrypted by a secret key. For this reason, the technique has generally been relegated to authenticating users to a server. Since the public key is only made available in encrypted form the system may be called pseudo PKI. The software camouflage technique places the private key on the users site so that it is released when the user enters a correct password. The private key is not merely encrypted with the password, however, but it is said to be camouflaged because when incorrect passwords are inputted, in many cases a false but otherwise plausible private key is generated. A challenge message encrypted with a false key is identifiable when submitted for authentication. The software camouflaging technique is readily scaled to large numbers of users since authentication is only carried out by a limited number of servers. This allows for minimal software requirement on the user's network access device and elimination of the need for hardware protection of the private key.

The pseudo PKI technolgy described above has been implemented in software known as WebFort™. Webfort™ is not capable of operating in a distributed e-services environment and is suitable for authenticating users to a server or integrated group of servers which constitutes a resource which the user seeks to access rather than for common authentication of unrelated entities to each other. The WebFort™ system does not support a mediated infrastructure.

In a preferred implementation of the instant invention, the WebFort functionality is organized into separate components and encapsulated in a custom software container operating on the e-Speak core to provide the functionality needed for authentication by the PAMS. The discovery and collaboration features are implemented as software applications operating on the e-Speak core. Interactions between users and the PAMS and between users connected through the PAMS are mediated by the e-Speak core. An audit trail of mediated interactions is created and preserved by audit agent software operating on the e-Speak core.

The preferred network is the public Internet, though embodiments of the invention can be applied to other public or private networks as well, and while the methods are described as being capable for facilitating transactions in global trade, it should be appreciated that the invention is equally applicable to smaller distances and other networks and not limited to global trade or the Internet.

The combination of the software pseudo PKI authentication agent, the audit agent, and the intelligent software platform provides unexpected benefits for enabling global business transactions. Placing the authentication agent on the intelligent software platform (e-speak) makes it possible to realize the security benefits of PKI in a manner practically suited for use in world trade where there are a large number of users seeking authentication to each other, as distinguished from authentication of users to a single server or service to which they seek access. The use of an encrypted public key in pseudo PKI is not a limitation since the PAMS is an intermediary to authentication and users have no need to know other users' public keys, since the authentication between two users occurs by both being individually authenticated to the PAMS, and then being authenticated to each other through mediation of the PAMS. The combination allows for providing the important elements identified for conducting business in an authenticated environment. In particular, users can dynamically locate suitable partners who are also enrolled in the system based on the software platform's discovery capability, and can become authenticated to other suitable users which have been located. Users have both fixed information which has been verified and dynamically variable data to aid in selection. Once suitable partners have been identified they can be introduced and connected as equals under the mediation of the persistent authentication and mediation service through the open software platform with the same high level of trust and confidence that they would have if each user maintained his own PKI authentication infrastructure. A collaboration environment is provided to facilitate making and memorializing a deal based on the persistent mediation of the software platform and the audit trail created by the audit agent. Sufficient evidence is collected to support non-repudiation. Partners are able to put together a complex project team by locating and seamlessly connecting additional authenticated participants. Workflow tools, authenticated bulletin board interactions, trading partner agreements, and deal libraries are provided.

There is an important additional benefit which accrues from using an open software platform such as e-Speak on which many user web sites will be operating. When the e-Speak core is operating on a user's computer or server, performance of the PAMS will be improved because mediated communications will proceed directly between the e-Speak cores by the e-Speak Interchange Protocol (ESIP), which is an optimized data transport specifically developed to handle e-Speak traffic on heavily used web site.

Users may be of any type which has access to the network through a microprocessor equipped device. A first type of user accesses the Internet through an Internet Service Provider using a browser. A second type of user has outsourced authentication for a web site or other network accessible application to the persistent authentication and mediation service. A third type of user could be a web connected automated software application or software operated hardware device. During the enrollment process each user would receive software which allows the particular user type to interact with the persistent authentication and mediation service. Each user would also receive a software smart card containing a camouflaged private key and a digital certificate containing an encrypted public key.

Usually users are part of a larger group, generally a business. A business will generally enroll with its own identity which will be verified by the persistent authentication and mediation service as well as a number of users which may include a combination of the types of users. Each user will have one or more personas which contains a subset of the verified business and user information. A persona identifies a user as part of the business as well as a particular unique individual (human or otherwise). Each business and user will also have information which may be dynamically varied by the user, such as a "shopping list" or inventory list. A persona can identify a users role within a business, such as title, amount the user is authorized to spend. A persona can be anonymous or not.

The authentication process can be initiated by a direct request from the user to the persistent authentication and mediation service or alternatively by a request to another user world wide web site which uses the persistent authentication and mediation service to regulate access to the site. In the latter case, the software provided to the web site will refer the user to the PAMS, which will authenticate the user and connect it to the web site, now under mediation of the PAMS. All communications with the persistent authentication and mediation service are mediated through the open software platform and once connected the user's interaction will be mediated by the persistent authentication and mediation service through the open software platform. Once a user has authenticated to the PAMS, it will not be necessary to repeat that process when gaining access to other users where an existing relationship exists or to connect to users which allow access to any user who is authenticated to the PAMS. This is a very useful feature allowing multiple contacts without repeated login procedures. Some users will require that they have the option to review and approve other users before granting them access.

A unique feature of the PAMS is its ability to provide one or more additional Authentication Providers (AP) in addition to the default authentication application described above as a part of the persistent authentication and mediation service. These additional Authentication Providers would perform private key software smart card issuance and authentication in some specialized manner such as extremely rapid authentication, an authentication accompanied by authentication insurance, or stronger security due to longer cryptographic keys. Thus the PAMS goes beyond the traditional role of providing a simple confirmation of whether a user is authentic, but allows a user to personalize authentication needs. For instance, some users will only want to deal with other users who use authentication accompanied by authentication insurance.

Similarly, PAMS can provide more than one Audit Providers, in addition to the default functionality provided in PAMS. Additional providers may perform special functions such as service quality monitoring, transactional volume monitoring, and status and status monitoring to support functions such as producing a bill for a service provider. PAMS is uniquely situated to monitor members usage of another members services and bill accordingly based on the mediation of all transactions. Another similar feature is that PAMS can be used to compile a map of transactions carried out by users. This map would show the type or frequency of contacts with other users. Another similar feature is that user's membership agreements may state that employees can only trade up to the amount they are authorized for the company. PAMS would track the amount purchased through PAMS and proactively notify business of any exceptions.

The value the audit agent and audit providers add is the ability to enforce trust relationships.

An object of the invention is to provide a method and system for providing a Persistent authentication and mediation service for reliably authenticating potential trade partners, infrastructure providers and collaborators of disparate types and widely separated locations to each other over a distributed network such as the public Internet and providing authenticated users with an environment suitable for conducting business transactions requiring a high level of trust, particularly in world wide trade.

A further object of the invention is to provide a method and system for providing a Persistent authentication and mediation service over a distributed network which is suitable for authentication of groups of disparate and widely separated users to each other under circumstances such as global trade where a trusted relationship is required.

A further object of the invention is to provide a method and system for providing a Persistent authentication and mediation service over a distributed network which will allow users to locate suitable trusted collaborators based on dynamically variable and verified information.

A still further object of the invention is to provide a method and system for providing a Persistent authentication and mediation service over a distributed network which will allow groups of authenticated users to interact under the mediation of the Service, such that the Service directly compiles an audit trail and information from the audit trail is made available to the interacting users.

A still further object of the invention is to provide a method and system for providing a Persistent authentication and mediation service over a distributed network which allows for peer to peer mutual authentication of groups users of different types.

A still further object of the invention is to provide a method and system for providing a Persistent authentication and mediation service over a distributed network which allows users to substitute trust in the Service for a direct relationship with another user in the steps of finding potential suitable trade partners, authenticating the identity of other users, and conducting a secure mediated interaction with other users.

BRIEF DESCRIPTION OF THE DRAWINGS

These and other features, aspects and advantages of the present invention will become better understood with regard to the following description, appended claims and accompanying drawings, where:

FIG. 6 is a block diagram illustrating the collaboration process.

FIG. 12 is an exemplary Persona Portal.

DETAILED DESCRIPTION OF THE PREFERRED EMBODIMENTS

General Description of the Service

Figure 1:
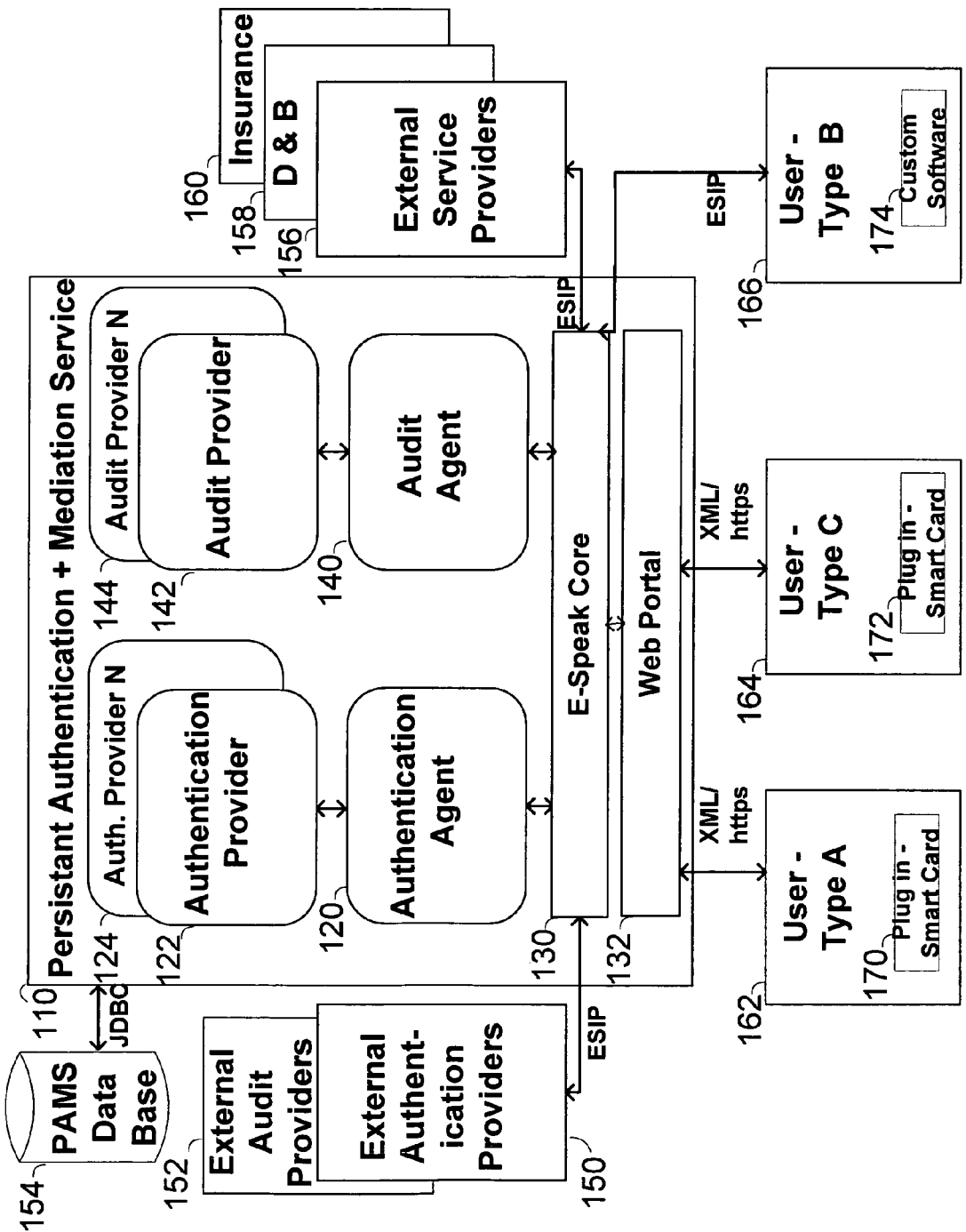
FIG. 1 is an overview block diagram of a preferred Persistent Authentication and Mediation Service (PAMS) which shows the system architecture.

The instant invention pertains to a method, an online service, and a system, for reliably authenticating trade partners, infrastructure providers and collaborators to each other over a distributed network such as the public Internet and providing authenticated users with an environment suitable for conducting business transactions requiring a high level of trust, particularly in world wide trade.

One preferred embodiment of the invention is an on-line persistent authentication and mediation service (PAMS) which is provided on a distributed public network such as the Internet. As used herein, a PAMS is a service provided over a network which is capable of authenticating groups of two or more users to each other by authenticating each user to the PAMS and then connecting authenticated users under persistent mediation of the PAMS. Authentication refers to the processes of a first entity proving its identity to one or more other entities over the network. Mediation refers to the fact that communications between authenticated users pass through the PAMS giving the PAMS the capability to monitor the interaction and compile an audit trail. Persistent refers to the fact that interaction remains mediated during the entire interaction, and the messages are transferred asynchronously so that the service maintains the message until it is delivered. In the context of this application, an on line PAMS is a service which is provided over a public network, such as the Internet, which is directly accessible to users of the network having the ordinary hardware to access the network, based on authentication and persistent mediation supplied by the PAMS.

Authentication among many users, according to the invention, is thus a two step process comprising authentication of each user to the PAMS followed by connection of the authenticated users through mediation of the PAMS. The two step process allows unexpected benefits in level of security and trust in the authentication and scalability to a system, particularly when there are a large number of widely separated users of many different types seeking to authenticate to each other. It should be appreciated that authentication of many users to a central party (many-to-one authentication) is intrinsically subject to much greater security and assurance than providing for each of the many users to authenticate directly to each other (many-to-many authentication). Yet, the needs of e-commerce as applied particularly to global trade require the more difficult many-to-many requirement to be solved. A PAMS according to the invention, provides a way to provide the security possible in many-to-one authentication while achieving the end results of many-to-many authentication.

In general, the goal of authentication in large scale electronic commerce is to provide the capability for "stranger-to-stranger" authentication, that is authentication of any two parties where the parties have complete trust that they know who they are dealing with while having had no prior relationship. In fact, what is required is the even more difficult task of authenticating a group (two or more) of strangers to each other. This can be accomplished in principal with a Public Key Infrastructure (PKI) where each party has a private key and a public key. The private key is known only to the owner while the public key is readily available but associated in some way with the owner. In order to be useful for authentication the private key must be subject to the strictest security measures so that no other party can have access to it or invoke it. Also a trustworthy third party must verify the public key/private key pair and verify that the private key is in the possession of the actual person seeking to use the keys for authentication. This is usually done by a trusted third party certification authority (CA) issuing a digital identity certificate binding the identity of the owner to a public key and signing the certificate with the private key of the CA (signing is the process of encrypting a message or digest of a message with a parties private key so that a person seeking to authenticate the message can do so by decrypting the encrypted message with the parties public key and comparing the decrypted message with the original message or digest to see whether they are identical.) The method is no more secure than the confidence in the identity certificates and the confidence in the security of the private keys. In practice a very extensive infrastructure would need to be supplied to accomplish a secure stranger-to-stranger system, usually employing a second agent known as a Registration authority (RA) who verifies the actual identity of a party seeking a certificate, obtains the public key, verifies that the party is in possession of the private key and that the private key is secure, and arranges for the secure delivery of the certificate. An authentication system such as described above is often called an "open" authentication system, in that parties may authenticate without having a prior direct relationship to each other.

A less satisfactory approach to PKI for authentication in a closed authentication system may be realized through requiring a user to share information they know or otherwise producing evidence of their identity, Many authentication techniques have been developed for this purpose such as user-ID/password, and symmetric cryptosystems, such as Kerberos. These systems, provide a lesser degree of security than PKI, and are not generally satisfactory, but may be acceptable when combined with the extra security PAMS mediation provides. For example, a user-ID/password could be supplemented by PAMS requiring the user to answer a question based on information in the PAMS audit trail.

The many-to-one model is intrinsically more secure than the many-to-many model simply because the certificates are only used by the one party which authenticates users seeking to use the resource which it protects. Ideally the authenticating party is also the CA and RA, or is closely related to them. This is a model often used for authentication within an enterprise where the authenticating party is protecting access to some resource, where the group is a limited in size and has a "real life" relationship to the authenticating party through the enterprise. It is often practical, in such an environment, to protect the private keys with very secure devices such as hardware smart cards, and to provide a further measure of security by encrypting the public key with a key known only to the authenticating party. Such a system provides a very high level of security and a very high level of confidence or trust that a user seeking authentication is the party it purports to be. An authentication system is said to be closed when a party being authenticated requires a prior relationship with the authenticating party. Thus a PKI architecture is often termed to be "closed" when only the CA relies on the identity certificates for authentication. In such a system parties must have a prior relationship with the CA prior to authentication.

The complexities of the many-to-many model generally preclude the use of secure devises such as hardware smart cards which become impractical to manage and prohibitively expensive for a large, disparate, and widely separated user population. Further, the identity certificates must be useable by each of the users to authenticate the identity of other parties. This situation is the familiar open PKI, which is well known in the art today, where users are forced to rely on identity certificates generated by an unrelated CA whose degree of diligence in verifying the true identity of the certificate holder is suspect, and where the security of the private keys may vary from user to user.

A PAMS according to the invention, is a hybrid of open and closed architectures in that it provides users authenticating to each other in a many to many environment with the high degree of confidence and security that characterizes the many-to-one environment because each user in fact begins a session by authenticating itself to the PAMS according to the many-to-one closed model where only the PAMS must directly rely on the identity certificates, and it has issued those certificates. The users then authenticate with other users by virtue of their trust in the PAMS and their connection to the other users which is mediated by the PAMS. Users of the PAMS have their identities verified through an enrollment process prior to being eligible for authentication to other users. Authentication of a first user and a second user in PAMS is accomplished by the first user and the second user authenticating to PAMS using a closed system architecture, preferably a closed PKI architecture, and then authenticating to each other by PAMS connecting the first member to the second member to each other using the persistent mediation of PAMS.

It should be noted that a novelty of the instant invention is the application of a closed authentication model system to a model that can comprise many members authenticating to each other, for instance in a manner consistent with meeting the demands of authentication among trading partners in global trade conducted over the Internet.

A PAMS according to a preferred embodiment of the invention authenticates users based on a PKI system where the private key and digital certificate are secured by software. This is important so that the system will be practically scaleable to a population of many distant and disparate users. Registration, distribution and administration can be accomplished over the network. A preferred PKI system involves protection of the private key by cryptographically camouflaging it in a software container, ie. a software smart card. This system provides the same level of protection as hardware smart cards under circumstances where the public key is encrypted so as to be accessible only to the party performing authentication. The structure of the PAMS allows adherence to the latter condition.

It should be noted that while PAMS issues software smart cards, the cards will generally conform to standards which allow it to interact with other devices. For instance the Public-Key Cryptography Standards (PKCS) defines a set of intervendor standard protocols for making possible secure information exchange on the Internet using a PKI. PKCS #11 defines a technology independent programming interface known as Cryptoki, for cryptographic devices such as smart cards and PCMIA cards. The preferred embodiment of the invention is compatible with PKCS #11. Those skilled in the art will appreciate that a PAMS could also adopt alternate compatibility standards. Thus it is possible for an application to request credentials from their software smart card just as if it were a hardware card, and for PAMS to accept credentials from a hardware card. PAMS establishes a Trust domain which follows a single certificate Policy statement so that all users trust the authentication from anywhere in the domain. The main Trust domain of the preferred embodiment uses software smart cards as the authentication approach. However PAMS offers a capability to recognize and authenticate credentials of external Registration Authorities defining Trust Domains external to PAMS and securing user credentials in a compatible device. Of course to maintain the PAMS trust integrity, ie., that any user in either domain will trust the authentication of another user through PAMS, external Registration Authorities require a higher level of security validation to PAMS prior to service.

Privacy is an important issue in PKI. Since the identity of a party is an integral part of the identity certificate, it is awkward to separate authentication from the party's actual identity, without having a plethora of identity or attribute certificates for each user. In a PAMS according to the invention, a user inherently reveals its identity to the PAMS, but has the ability to control which information is passed on to the other party, making it possible to have an anonymous authenticated interaction. For instance a view of a user's relevant verified credentials or role within a company could be passed on without actually identifying the user.

Authentication is the first part of a trust relationship. Since users are connected under mediation of the PAMS, the interaction continues to be monitored by the PAMS, establishing an audit trail which is accessible to the interacting users. The PAMS provides a non-repudiation environment which ultimately supports enforcement of the results of the interaction. The PAMS provides functionality which allows users to discover other members according to dynamically variable criteria, based on information which has been verified by the PAMS as well as user controlled information. The PAMS provides functionality for collaboration between members and documentation of the collaboration based on the audit trail compiled due to the mediation function. Collaboration may include many normal network functions provided in a non-repudiation environment, such as certified delivery electronic mail and ability to sign documents and verify the signing. Trust may be based on the reputation of a party, that is a generally held opinion about the party. A party may have confidence or trust in another party based on his own experience in dealing with the party. This method often used in every day transactions and is often a time consuming learning process based on a sequence of transactions involving gradually increasing importance. Trust may also be based on general reputation in a community where the parties interact. Trust may also be based on recommendations of other parties. Finally, trust may be based on insurance obtained from an outside source.

The structure of the PAMS provides an unexpected benefit in providing a basis for establishing trust in direct transactions over a public network such as the Internet without necessity of any relationship other than PAMS. The PAMS begins the establishment of trust by verifying the identity of users and verifying their credentials in an enrollment process prior to issuing an identity certificate. The PAMS also has the ability to allow a user to select from alternative authentication options which offer different levels of security, convenience and cost. Since interactions between users are mediated by the PAMS, the PAMS may obtain a continuously evolving independent rating of a user based on the number, type and quality of interactions and a reputation based on feedback from other users. This information can be supplied to other users considering establishing a relationship or by an insurance provider who can provide insurance for a transaction based on the reputation or the parties authentication security level.

The preferred method for providing a persistent authentication and mediation service (PAMS) on a public distributed network involves the following acts:

1. Providing an online service, available on the network, which is capable of authenticating users and connecting authenticated user with persistent mediation of the online service.
2. enrolling users—This step includes distributing software to each user which enables the user to authenticate to the persistent authentication and mediation service, generating and distributing a private key and a public key to the user in a software protected form supporting a closed PKI architecture, obtaining credentials particular to the user, verifying the validity of the credentials, and storing the credentials in a customer database. Examples of users includes the type which accesses the Internet through an Internet Service Provider using a browser. A second type of user uses the persistent authentication and mediation service to control access to a web site. A third type of user could be a web accessible automated software application.

3. authenticating enrolled users to the common authentication system using the software Public Key Infrastructure (PKI) system.—This step includes the persistent authentication and mediation service generating a challenge message and sending it to the user seeking to be authenticated, receiving a response generated by the software which was provided to the user which includes an encrypted message and a digital certificate containing the user's public key, decrypting the response using the user's public key, verifying whether the response is authentic and rejecting the user if the response is not authentic. A preferred PKI system is a pseudo-PKI system one where the private key is protected by cryptographic software camouflage and the public key is encrypted by a key known only to the persistent authentication and mediation service. Such a system has the advantage of providing a very high level of security and confidence in the PAMS structure while being scaleable to a large and diverse population since the identity certificate and software smart card are distributed over the network. The preferred pseudo-PKI system will be described in detail later in the application.

4. receiving requests from authenticated users to be connected to particular other users —The PAMS provides a dynamic discovery functionality whereby authenticated users may locate other enrolled users according to search criteria. Users may search the dynamically variable PAMS data based on verified credentials and user variable information such as a "shopping list" or inventory. The user may simply click on a discovered user to contact that user. Of course, a first user may know the URL of a second user's web site on the Internet. If the second user utilizes the PAMS for authentication, the first user will be directed to the PAMS by the software provided to the second user's web site. The first user will then be authenticated to the PAMS as described in step 2 and connected to the second user under mediation of the PAMS. Some web sites may choose to use the PAMS as the sole means of controlling access to the site. In this case an entity which has not completed enrollment in the PAMS will be referred to the enrollment function of the PAMS.

5. connecting groups of authenticated users under mediation of the persistent authentication and mediation service—groups may include two or more users, and may include users of the same or different types.

6. mediating the interaction among connected users, including supplying authenticated information about each user to the interaction, and optionally removing the identifying information which is normally provided by the distributed network, directly compiling an audit trail of the interaction, and making information from the audit trail available to the connected users. Mediation is a valuable feature which most users will wish to retain throughout an interaction. However, in some cases users may choose to disable mediation, and continue the interaction with out mediation and the audit trail. Mediation is mandatory for establishment of full trust during authentication, but optional after authentication.

7. providing collaboration functionality to each group of interacting users to facilitate interaction between the users—the collaboration functionality includes a portal for browser users including a message board for posting authenticated messages among the collaborating users, and providing the users with access to the audit trail. Equivalent functionality is provided through API's to transfer the authenticated exchange without a user interface for users not using a browser. The collaboration functionality preferably includes tools needed to exchange digitally signed documents attesting to their agreement. Another preferred collaboration capability which derives from the mediation of interactions is that electronic mail exchanged between parties can be certified, that is a receipt is generated when the mail is delivered and/or received.

A persistent mediated interaction has an audit trail which is maintained under the control of the PAMS, and is available to the users. An important feature of an interaction under the PAMS is that users, including users of different types, interact under circumstances where after their identity is authenticated by the PAMS and they are connected to other users under mediation of the PAMS, the interaction continues to be mediated by the PAMS during the interaction, so that an audit trail is accumulated. The audit trail is available to the users during the interaction and may include the content of the interaction. Exactly what content will be preserved is user determined. Another key feature is that groups of three or more users may interact. The mediated environment is a key part of establishing trust in the identity of the parties during the authentication process and is the basis for monitoring and enforcing trust during and after the transaction.

Mediation of interactions also provides capabilities which are ancillary to authentication. One capability is for businesses to monitor the quality of service provided by their business partners. Another example is to monitor the response time experienced by visitors to the business's site.

Mediation is a valuable feature which most users will wish to retain throughout an interaction. However, in some cases users may choose to continue the interaction outside of the PAMS mediation and the audit trail. Mediation is mandatory for establishment of full trust during authentication, but optional after authentication. Users may elect to carry on interactions through a parallel connection which is not mediated by PAMS. PAMS may readily be configured to offer users to alternate between the mediated and direct connection.

When all transactions are mediated, PAMS provides the optional feature of monitoring one user's use of another user's resources, and billing for those resources. Another optional feature is to compile a transaction usage map for users which reveals the identity and frequency of user contacts with other user's. This feature can provide a valuable tool for analyzing a user's business patterns, for instance identifying bottlenecks.

Another optional feature is the capability for authenticated users to interact with network users which are not authenticated or even enrolled in the PAMS. For instance an authenticated Internet user accessing the PAMS with a browser may access a web site which not enrolled in the PAMS by entering the URL into the Discovery Portal. A user which is connected to the non-enrolled site does not enjoy the full benefits of PAMS, however the interaction will be mediated by the PAMS, including the audit trail. The authenticated user will also have the capability of anonymous interaction with the non-enrolled site, since the PAMS can remove the identifying header information from the Internet message.

Another application of persistent authenticated mediation is anonymous processing credit card transactions. In current applications, a cardholder transmits his credit card information to a merchant over an Internet connection. The merchant, in turn, seeks authorization by transmitting the information to the merchant's bank (called the acquiring bank) which in turn seeks authorization from the card holder's issuing bank. An approval is passed back to the merchant, through the acquiring bank, and the merchant completes the transaction. In the PAMS mediated transaction, the card holder has authenticated to PAMS, and is shopping with the merchant under mediation of PAMS through a PAMS application, for example a wallet program such as Netar operating as a PAMS application program. The cardholder enters his credit card information into the wallet, and a corresponding reference ID is created. The reference ID looks like a credit card number and is partly composed of random numbers the cardholder can enter, as well as required information such as the (Bank Identification Number) BIN number of the Payment Processor who is a PAMS external Service Provider. The Payment Processor also has access to the credit card network (such as VISA or Mastercard). When a payment is to be made, the reference ID is passed to the merchant in place of a credit card number. The merchant thinks the reference ID is a credit card number and passes it on to the acquiring bank. The acquiring bank sends the transaction to the Payment Processor whom the acquiring bank thinks is the issuing bank. The Payment Processor obtains the card holders actual credit card number and billing address from Netar, which is passed to the issuing bank for authorization. Authorization or rejection is passed back to the merchant through the Payment Processor and the acquiring bank. The cardholder's interaction with the merchant can be as anonymous as desired, and the cardholder's confidential information is not transmitted over the Internet (only the transactions involving the merchant and the cardholder are transmitted over the Internet—all others are high speed secure transmissions). Additional benefits accrue when the Payment Processor is also the acquiring or issuing bank.

A unique feature of the PAMS is its ability to provide one or more additional Authentication Providers (AP) in addition to a default authentication application which was described above as a part of the persistent authentication and mediation service. These additional AP's all interface through the default authentication application and await service requests from the default application. These additional Authentication Providers would perform private key software smart card issuance and authentication in some specialized manner such as extremely rapid authentication, authentication accompanied by authentication insurance, or authentication specialized on a certain geography or device type. Additional AP's may also be the interface to alternative trust domains having credentials issued by an RA external to PAMS. Thus the PAMS goes beyond the traditional role of providing a simple confirmation of whether a user is authentic, but allows users to personalize authentication needs. For instance, some users will only want to deal with other users who use authentication accompanied by authentication insurance.

Another feature of PAMS is the option to provide alternative audit providers which interface through the default application audit provider similarly to authentication providers. Alternative audit providers may offer special auditing services such as auditing service quality, business transaction volume and status, and state of the art messaging system. Audit providers may offer different levels of security or safety of storage. The presence of additional authentication providers and additional audit providers enable a particularly attractive options for privacy and security of users. The additional providers may be internal (providers which are located at the same physical setting and get started in the PAMS boot-up process) or external (providers which reside elsewhere on the network). By choosing external authentication and audit providers a user may choose where his information resides and how it is secured. This feature of the PAMS architecture, allows the user the ability to separate identification information (coming through the authentication agent) from transactional information (coming through the audit agent). The user is able to see the data transparently combined through the web portal while the data are actually coming from multiple places. This feature allows users a method by which fully authenticated users can transact anonymously with other users.

Usually users are part of a larger group or enterprise of some type, generally a business. For convenience in this application, since a primary target of the invention is international trade transactions, the word business will be used to refer to entities of all types, including all entities comprising one or more users with some connection which causes them to be grouped for the purpose of authentication. A business transaction or transaction will similarly refer to the interaction between two or more users. Even though the embodiments will be described in terms of businesses and business transactions, it will be appreciated by those skilled in the art that that the invention includes all type of transactions which benefit by authentication and trust among the parties.

A business will generally enroll with its own identity which will be verified by the persistent authentication and mediation service as well as a number of users which may include a combination of the types of users. Each user will have one or more personas which contains a subset of the verified business and user information. A persona identifies a user as part of the business as well as a particular unique individual (human or otherwise). Each business and user will also have information which may be dynamically varied by the user, such as a "shopping list" or inventory list. A persona can identify a users role within a business, such as title, and the amount the user is authorized to spend. A persona can be anonymous or not and a user may have both identified and anonymous personas. Anonymous personas are a significant in light of the PAMS's ability to provide for authenticated anonymous interactions.

When the PAMS uses the preferred pseudo-PKI system, where a user's public key is contained in encrypted form on an identity certificate which is forwarded to the PAMS with the challenge response, a significant security benefit is realized, in that there is no need for the PAMS to store the public key or other access parameter on the authentication server making a breach of the system much less likely.

The authentication process can be initiated by a direct request from the user to the persistent authentication and mediation service or alternatively by a request to another user world wide web site which uses the persistent authentication and mediation service to regulate access to the site. In the latter case, the software provided to the web site will refer the user to the PAMS, which will authenticate the user and connect it to the web site, now under mediation of the PAMS. All communications with the persistent authentication and mediation service are mediated through the open software platform and once connected the user's interaction will be mediated by the persistent authentication and mediation service through the open software platform. Once a user has authenticated to the PAMS, it will not be necessary to repeat that process when gaining access to other users where an existing relationship exists or to connect to users which allow access to any user who is authenticated to the PAMS. This is a very useful feature of allowing multiple contacts without repeated login procedures. Some users will require a selection process before establishing a relationship.

Authentication of a user to the PAMS will generally expire after passage of a specified period of time or upon execution of a log off procedure.

A very important feature of the PAMS is that the PAMS provides a platform to form new relationships which did not previously exist. Enrolled users of the PAMS can find other users by searching the dynamically variable database of verified and user variable data to find suitable partners. Some users will accept any potential "customer" as a partner, while others will have qualifying criteria which they can verify based on the credentials maintained in the PAMS database. A preferred optional feature of the PAMS is to provide work flow processes which allow a first user to screen the persona of a second user against predetermined criteria, and either accept or reject formation of the relationship based on the comparison. An example is a business with a web site which is enrolled in the PAMS and uses the PAMS to control access to its site. For instance, the business may indicate that it wants to form relationships with any user which is authorized to make purchases over $100,000. Prospective partners which discover the business from the discovery portal will be transparently screened by the PAMS and admitted or not based on the result of the screening.

Combining authentication with persistent mediation provides an unexpected benefit in establishment of trust in interactions over the Internet. Just as many to many group communication tends to be more complex than one to many communication, security in the many to many context is harder to achieve. As group membership changes, trust among group members may change, and a trust providing infrastructure must be dynamic to accommodate the changes. The amount of trust placed in a digital certificate decreases over time, as an older certificate is more likely to have been compromised. CA's typically renew certificates once a year in an open PKI. Thus the relationship between a CA and a customer is normally based on infrequent contact. PAMS on the other hand is continuously involved in the end to end transactions performed by a customer, providing continued performance monitoring and being alerted to changes in status and consequently decreased risk. Information content which is available on the Internet, has generally no meaning without a well-understood context. In the case of global commerce, the context itself is in a constant state of change as parties interact and new traders appear and disappear. The combination of authentication and persistent mediation provided by PAMS provides a persistent context to the information content.

Once established with a group of enrolled users, the PAMS and the enrolled users form a virtual network which exists on a public network such as the Internet. Enrolled users sign on to the network when they begin a session by authenticating to the PAMS. They may search for other members using the PAMS, and interact with other members with trust in their identity based on entry to the network being guarded by the PAMS. All interactions between users over the virtual network are mediated by the PAMS. The virtual network provides a particularly convenient forum for its users due to the ability to access other users seamlessly without repeated login procedures.

Description of the System Architecture

While the service described could be implemented in many different embodiments, the preferred implementation of the invention utilizes two new classes of network software which are synergistically suited for providing the PAMS. The preferred implementation comprises a host site connected to the network, the host site including at least one computer server operated by an open software platform providing intelligent interactions, a persistent authentication and mediation service comprising a software pseudo PKI authentication agent operating on the open software platform, an audit agent operating on the open software platform for monitoring and storing mediated messages, and application software operating on the open software platform with functionality for enrolling users, authenticating enrolled users, allowing authenticated users to dynamically find suitable partners according to criteria which they specify, and allowing authenticated partners to interact under the mediation of the common authenticating service through the open software platform. The authentication system further preferably further comprises a customer database server separate from the open software platform comprising a database of information about the registered businesses, the database being accessible to the persistent authentication and mediation service, though it is possible to include the information within the database maintained by the open software platform.

In the context of this application, an open software platform refers to a platform where users and enabled services operating under the platform can interact regardless of their hardware or operating systems, system management strategies, development environments or device capabilities. Intelligent interaction refers to the ability of enabled services to discover, negotiate, mediate, and compose themselves into more complicated services. The platform is analogous to an operating system, but instead of just mediating fixed requests from a process for resources and mapping virtual addresses to actual addresses, the operating system is capable of mediating global Internet services. All of the major functions of the service are preferably implemented through the open software platform, which mediates all interactions between PAMS and users. A preferred open software platform is Hewlett Packard's e-Speak, currently available as version 3.01. The e-Speak platform is implemented by an e-Speak core program which operates on a user's computer or server. In e-Speak, enabled services are referred to as e-Services. The ability to discover refers to the fact that when an e-service registers with a host system accessible to the network and creates a description of the service it provides, users of the system can automatically discover services which have desired attributes, and contact them without needing to have known about the service in advance or knowing its URL. To negotiate refers to the fact that e-Speak negotiates between the requester and provider to eliminate services which are outside of the requested criteria. To mediate refers to the fact that users are connected through the e-Speak core and e-speak continuously intermediates the service delivery after the user and e-service have been connected. Users do not normally interface directly, interactions are by default mediated by the service. As previously mentioned there may be times when users prefer to interact directly without mediation. A preferred embodiment of PAMS includes the capability to alternate between mediated and direct interaction after authentication has been completed using persistent mediation. To compose refers to the ability of e-services to combine themselves into more complex, cascading e-services even dynamically. While e-Speak is the preferred open platform, other open platforms which could be well suitable for providing the service, such as those provided by Microsoft, IBM and Sun, particularly platforms which provide the capability for discovery, negotiation, and mediation as described above.

Another alternative embodiment is to build the necessary functionality into a dedicated software package performing similar functions as e-Speak.

An essential part of the service of the instant invention is an authentication agent which is part of the PAMS. The authentication agent performs the first step in the authentication process, namely authenticating a user to the PAMS. In the preferred embodiment the authentication agent comprises software functionality operating on the open software platform. The combination of the common authentication agent with the open software platform is a particularly synergistic combination in that authentication agent performs the authentication of a user to the PAMS, while the open platform provides the persistent mediated connection between authenticated users. The open software platform mediates the exchanges between the authentication agent and the various users and then the interaction between authenticated users interacting under the PAMS.

Another essential part of the service is an audit agent, which like the authentication agent is a software application operating on the open software platform. While e-Speak mediates all messages the messages are only stored until delivered. The audit agent performs logging and monitoring for all transaction events that occur in the system. The audit agent intercepts all interested events during mediation by the e-Speak core and stores them in a permanent store such as a database.

Another essential part of the service is a PAMS database. The PAMS database component contains the customer relationship management (CRM) information for each registered user. Such information includes user-specific reputation ratings, business partners, past and current dealings, and so forth that are personalized for each user.

Other features for promoting business transactions requiring trust, such as the ability to enroll users and compile a customer database of verified and variable information about users, ability for authenticated users to dynamically discover other enrolled users based on the information in the customer database meeting particular criteria, and to transact business with authenticated partners under the mediation of the service to provide for non-repudiation of the transactions, are preferably provided as software applications operating on the open software platform either integrated into a single package, or as separate software applications. In the preferred embodiment these software application these functions are part of the extensible Web Access component of e-Speak and are known as the Web Portal. The Web Portal is accessible via xml/https or ESIP via the e-Speak core.

There is an important benefit which accrues from using an open software platform such as e-Speak on which many user web sites will be operating to take advantage of its electronic commerce advantages. When the e-Speak core is operating on a user's computer or server, performance of the PAMS will be improved because mediated communications will proceed directly between the e-Speak cores of the user and the PAMS through the e-Speak Interexchange Protocol (ESIP) which is an optimized data transport for handling e-Speak traffic. It is not necessary, however, that the e-Speak core be installed on a user's network access device for it to utilize the PAMS. Typically users who are service providers providing services through a world wide web site will us the ESIP "core to core" connection, while users accessing through a web browser will connect with XML over HTTP. Performance-sensitive services use ESIP to communicate with PAMS. E-speak also provides a proprietary EIDL compiler (See Appendix D of the E-speak's Programmer's Guide) that generates stub files on top of ESIP for efficient programmatic access from clients to an e-speak service.

PAMS is to be deployed on high-end computer systems with fast Internet connections. Therefore, successive improvements in Internet router/switch technologies and computer systems, which has been taken for granted in today's marketplace, will help PAMS to perform under increasing workload.

In addition to mediation, the open software platform provides asynchronous message delivery providing persistence of messages until delivered. The persistent authentication and mediation service requires an asynchronous architecture to provide fault tolerance in a widely dispersed network so that messages will be preserved during server or network failures. The open software platform provides the persistent message queue management that is necessary to support the persistent authentication and mediation service on a global scale. Authenticated connections are preferably secure connections such as SSL, which is supported by e-Speak.

In a PAMS in accordance with the invention, it is necessary that the authentication agent provide a high degree of confidence that the authenticated party is the entity which it purports to be, since a user's trust in the authenticity of another user can be no stronger than the trust that the PAMS has properly authenticated the other user. At the same time the authentication agent should employ an implementation which is scaleable for use by a very large number of potential users, preferably hundreds of thousands or millions of users distributed world wide. Ordinary id/password systems which are commonly employed for authentication to servers or on-line services will not be considered to be sufficiently secure to proceed with major transactions based on their trust in the authentication. Public Key Infrastructure (PKI) systems are recognized to provide a high degree of security provided that the private key is well secured, however the common method of employing PKI by simply encrypting a private key located on the users device with a password is subject to attack by an intruder and may be useful for some purposes but not others. Approaches where identity certificates are stored on central servers and downloaded when requested, limit the ability to provide non-repudiation as multiple copies of the certificates exist. Hardware based smart card systems for protecting the private key are very secure but are considered to be very costly and unmanageable for a large and widely dispersed group of users such as is contemplated in world wide trade which is a primary application contemplated for the invention. A preferred strong software protected pseudo PKI system is a system such as the pseudo PKI system described in U.S. Pat. No. 6,170,058, "Method and Apparatus for Secure Cryptographic Key Storage, Certification and Use", and "Software Smart Cards via Cryptographic Camouflage" by D. Hoover and N. Kausik (1999 IEEE Symposium on Security and Privacy"). The above technique protects the private key by means of a cryptographic software camouflage, which provides similar security benefits to hardware based PKI but is limited to circumstances where messages are only verified by pre-defined trusted entities. This restriction occurs since the method requires that to maintain security of the private key, the user's public key be distributed on a certificate in an encrypted form which can only be decrypted by a secret key, which is controlled by the trusted entities. For this reason, the technique has generally been relegated the technique to authenticating users to a resource within an enterprise rather than many-to-many authentication among a group of users. Since the public key is only made available in encrypted form the system is called pseudo PKI. The software camouflage technique places the private key on the users site so that it is released when the user enters a correct password. The private key is not merely encrypted with the password, however, but it is said to be camouflaged because when incorrect passwords are inputted, in many cases a false but otherwise plausible private key is generated. A challenge message encrypted with a false key is identifiable when submitted for authentication. The software camouflaging technique is readily scaled to large numbers of users since authentication is only carried out by a limited number of servers. This allows for a minimal software requirement on the user's network access device which can be conveniently distributed over the network and elimination of the need for hardware protection of the private key.

The technology for implementing a pseudo PKI system described above has been implemented in software known as WebFort™. Webfort™ as such is not capable of operating in a distributed e-services environment and is suitable for authenticating users to a server or integrated group of servers which constitutes a resource which the user seeks to access rather than for common authentication of unrelated entities to each other. The WebFort™ system does not support a mediated infrastructure.

The combination of online authentication using the cryptographic key storage PKI technology described above with persistent mediation solves the principal weakness of the cryptographic key storage when used alone. When used alone the technology is subject to attack by an individual who somehow obtains the correct PIN (as by clandestine observation) and also has access to the workstation on which the software smart card is stored. Such an individual could readily defeat the system. In a PAMS, however, the continuous monitoring function could readily provide an alert to the owner via another channel such as telephone or email that the digital certificate is being used.

In a preferred implementation of the PAMS, the WebFort™ functions to carry out pseudo-PKI are organized into separate components and encapsulated in a custom software container operating on the e-Speak core to provide the functionality to enable authentication of users to the PAMS. The implementation of the discovery and collaboration features are implemented as software applications operating on the e-Speak core either preferably as an extension of the e-Speak Web Access component. Interactions between users and the PAMS and between users connected by the PAMS are mediated by the e-Speak core.

At this moment, only Arcot's card operations need to be wrapped in JNI. Other APIs such as getChallengeo and verifyReponse( ) are supported by Arcot's Java toolkit (Arcot's Application SDK Client API). The following JNI functions wrap around the SDK's administration C/C++APIs:

JNIExportjbyteArray JNICALL Java_arcot_service_wallet_create(JNIEnv *env, jobject jobj, jstringjuserID, jstringjcardName);

JNIExportjbyteArray JNICALL Java_arcot_service_wallet_exists(JNIEnv *env, jobject jobj, jstringjuserID, jstringjcardName).

The JNI wrapper APIs are based on Sun's standard JNI Specification (Java Native Interface Specification (http://java.sun.com).

In the preferred embodiment of the invention, the service further comprises additional authentication providers in addition to the main authentication agent. The additional authentication providers perform special services such as providing extremely rapid authentication or providing authentication insurance combined with the authentication. The preferred embodiment further comprises additional audit providers in addition to the default audit agent provided with PAMS. Additional providers may perform special functions such as service quality monitoring, transactional volume monitoring, and status.

The preferred network is the public Internet, though embodiments of the invention can be applied to other large scale networks as well, and while the methods are described as being capable for facilitating transactions in global trade, it should be appreciated that the invention is equally applicable to smaller distances and other networks and not limited to global trade or the Internet.

FIG. 1 describes a logical view of a preferred PAMS system utilizing the e-Speak open software platform. Actual system configurations can vary considerably. For instance, the entire PAMS system functionality can be distributed across application servers, Web servers, e-speak Cores, and multiple databases. Through e-speak Core-to-Core communication, PAMS systems can easily connect to one another to form a cluster of PAMS networks providing the same consistent view to the users. PAMS, acting as the primary backend component, along with other Web portal front-end components, forms a complete online service.

Internally PAMS consists of three primary system components: authentication agent, audit agent, and e-speak. Both agents maintain a list of internal service providers for authentication and auditing. The authentication agent relies on WebFort for software smart card implementation. The audit agent relies on e-speak for mediation functionality.

Referring to FIG. 1, a preferred PAMS system 110 is shown, comprising an authentication agent 120 is shown operating on an open software platform, here the e-Speak core 130. Several Authentication Providers are shown, Authentication Provider 1 (122), through Authentication Provider N 124. The Authentication Providers include the functionality for enrolling users and authenticating enrolled users to the PAMS. The default Authentication Provider is part of the Authentication Agent 120. An Audit Agent 140 is shown with Additional Audit Providers 142 and 144. Authentication Providers 150 and Audit Providers 152 are additional external providers. Also shown are special external service providers 156, 158, and 160 which are services outside of PAMS which have been enrolled as member in the PAMS and will be frequently utilized by other members.

The Authentication Agent is an integral part of PAMS. It leverages a local e-speak Core to provide authentication services for PAMS. The agent serves as the default Registration Authority in PAMS, it is the RA for users enrolled by PAMS. It is optionally possible for PAMS to recognize certificates issued by others and authenticated by an external Authentication Provider which interfaces through the Authentication Agent. In this case, before authenticating, information about each user is stored in the PAMS database creating a relationship between PAMS and the user.

The Authentication Agent acts as proxy to other internal or external authentication providers which serve as the Certificate Authority. The Agent implements e-speak's service interface, thus qualifying it as an e-service. The agent by default hosts an internal authentication service that wraps around WebFort. Generation of certificates within the agent is the default operating mode when an external authentication provider is not being utilized. As PAMS' default authentication provider, this service implements the pamsAuthSPIntf interface as defined below.

The Agent decides which authentication provider to use based on certain attributes of the incoming request, such as cost or response time requirements. The Authentication Agent is accessible through its interface defined as following:

```
/** pamsAuthAgentIntf:
**
** Notes: interface to PAMS Authentication Agent
**/
interface pamsAuthAgentIIntf
    extends ESService, pamsAuthSPIntf
{
    // open new account with PAMS
    boolean openAccount(int userType, AccountInfo newUser);
    // update account information
    void updateAccount(AccountInfo update);
    // close account
    boolean closeAccount(String userName);
    // find service providers
    ESURL[] findServices(ESServiceDescription sd);
    // establish relationship with a service partner
    boolean formRelationship(ESURL partner);
    // update user database
    boolean update UserDatabase( ),
    // distribute software smart cards
    byte[] getSmartCard(String userName);
    // validate data with external SPs
    boolean validateData(byte[] data, ESURL sp);
}
```

The Authentication Agent provides built-in authentication, as indicated by its implementation of the pamsAuthSPIntf. Internally it implements a JNI adapter to WebFort's public C-based SDK. The agent mediates all calls for authentication. Other Web Portal components can call the agent service by name. (Web Portal discussed below is the interface for access to PAMS).

The Authentication Agent is called by Web portal components when authentication is required, in cases where access to protected resources is requested. Type B clients, however, would bypass the portal and access the agent directly.

An Authentication provider (AP) from the PAMS viewpoint belongs to one of two classifications: internal or external. An internal AP is local and packaged with PAMS together; local AP's can be considered premier AP's. External AP's are located remotely, and connected to PAMS through the administration console by conforming to the e-speak service interface. External AP's require higher level of security validation to PAMS prior to service. Both types of providers implement the same pamsAuthSPIntf interface.

As stated earlier, all authentication providers await service requests from the Authentication Agent. The Agent holds sway over which AP gets selected for a particular transaction based on the service attributes such as cost and service response requirements.

```
The following interface must be implemented by all PAMS authentication
service providers:
/** pamsAuthSPIntf:
**
** Notes: to be implemented by authentication service providers
**/
interface pamsAuthSPIntf
{
    // request a challenge string from authentication server
    String getChallenge( );
    // verify response to requested challenge string
    boolean verifyResponse(String resp );
    // verify signed data from authentication server
```

```
-continued boolean verifySignedData(int encodingScheme, byte[] signedData) ;
    // sign data
    byte[] signData(int encodingScheme, byte[] rawData);
    // check io see if card already exists
    Boolean cardExists(String walletName, String cardName, String
    userID);
    // create a sofware card
    byte[] cardCreate(String walletName, String cardName, String
    userID );
    // verify cookie
    boolean isCookieValid(String cookieName, byte[] cookieData);
// delete cookie
void deleteCookie(String cookieName) ;
}
```

Note that an alternative XML messaging interface that wrap these methods can be provided so that HTTP requests can access this interface.

The audit agent in PAMS performs logging and monitoring service for all transaction events that occur in the system. In e-speak terminology, it utilizes the system event logging provided as a default service by e-speak Core. Specifically, the Agent hooks into the publish/subscribe event manager of the e-speak Core. As part of monitoring, the agent can raise a warning flag, suspend, or terminate sessions that are suspicious in nature.

Once registered, the agent intercepts all interested events or messages during mediation by e-speak Core. The agent can put the transaction events in a permanent store, such as a database or secure store such as HP's VirtualVault.

The audit agent interface is defined as follows:

```
/** pamsAuditAgentIntf:
**
** Notes: service contract interface to PAMS Agent
**/
interface pamsAuditAgentIntf
    extends ESService, pamsAuditSPIntf
{
    // set the date/time source
    void setUniversalDateTime(URL date TimeSource);
    // generate message authentication code for log entry
    String generateMACId(byte[] logData);
}
```

The PAMS system leverages on e-speak's open architecture for e-services. One is the definition of an audit service provider interface. Any e-speak service that implements this interface can registers with PAMS as an audit service provider. Part of the registration process requires validation for approval of the service itself.

In addition to providing persistent logging which can form the basis for compiling audit trails, audit service providers can choose to monitor PAMS for critical information such as existing service quality, business transactions volume and status, and the state of the messaging system. This set of differentiating features provides distinct value-added service to PAMS operators for system monitoring and management purposes.

```
/** pamsAuditSPIntf:
**
** Notes: to be implemented by audit service providers
**/
interface pamsAuditSPIntf
```

-continued

```
{
    // log entry type constants
    int log_text = 0;
    int log_image = 1;
    int log_binary = 2;
    int log_video = 3;
    int log_voice = 4;
    // log binary data with its description
    void logEntry(String macId, String entryDesc, int entryType, byte[]
    entryData);
    // return the entry data type
    int getLogEntryType(String macId);
    // get the log entry description
    String getLogEntryDesc(String macId);
    // get the binary data
    Byte[] getLogEntryData(String macId);
    // archive the log entries based on criteria such as age of the entries
    boolean archiveNow(ArchiveCriteria ac);
}
```

Note that an alternative XML messaging interface that wrap these methods can also be provided so that HTTP requests can access this interface.

Both authentication and audit service providers use the same mechanism for service management. Specifically, PAMS administrator has at its disposal a browser-based administration console that allows the management of new and existing service providers. Therefore each PAMS service provider must fully implement the relevant PAMS service provider interface in eSpeak context and be validated and approved by PAMS authority leading to acceptance of PAMS access control list (ACL) of validated service providers.

PAMS administrator can use the very same authentication service to validate service providers.

PAMS includes a PAMS Database 154. The PAMS database component contains the customer relationship management (CRM) information for each registered user. Such information includes user-specific reputation ratings, business partners, past and current dealings, and so forth that are personalized for each user. Thus this component is essential to implementing the MyPAMS part of the portal (MyPAMS is similar to MyYahoo—a common Web portal feature.

PAMS database can be a relational database or a directory. The former is accessible through JDBC interface (Java Database Connectivity API.

(http://java.sun.com/products/jdbc/index.html)), with the latter through LDAP (Lightweight Directory Access Protocol).

PAMS service providers (Authentication or Audit Providers) can be internal or external. Internal providers are local to PAMS; they reside in the same physical setting and get started as part of the PAMS boot-up process. Internal providers are integral parts of PAMS system. External service providers reside elsewhere in the network, and typically connect via a communication link. External providers must be authorized by PAMS operator for their services to be enabled.

External PAMS service providers can connect with ESIP or XML, depending on the interface specification or the service contract, of the defined service. For instance, given PAMS Authentication Service Provider interface is defined as a set of Java methods, any compliant authentication provider will have to implement this interface to become available to the PAMS network and therefore would typically use ESIP. PAMS service providers can choose to connect to PAMS through a private secure dedicated link or through virtual private network (VPN) protocol on the Internet.

Other external service providers (156, 158, 160)are verbatim e-speak services that have registered with PAMS directly or discovered through the e-speak's distributed advertising service that make services registered in different e-speak Core visible to one another.

The Web Portal 132 is the interface for user access to the PAMS services. Key functionality exposed through the portal includes user management, service provider management, collaboration, service discovery, authentication, and persistent mediation. Basic PAMS services provided by the authentication agent, audit agent, or e-Speak are accessed through the portal while other functions such as collaboration and discovery are implemented as in the Web Portal.

There are three main types of PAMS user clients for PAMS portal. They are distinguished by how they access the portal as well as what they can access.

Type A 162 is through the Web browser with XML over HTTP. It has access to all other portal features in addition to authenticated mediation. Software is provided to the user by PAMS which allows it to communicate with the authentication agent. This may be in the form of an applet which is downloaded via the network each time the application is called, or as by a browser plug-in which can be permanently downloaded. The software smart card including the private key and the digital certificate is stored on the users device. For users accessing the network from a computing device with adequate non-volatile memory, it will generally be preferred that the smart card be stored on the users device in the non-volatile memory. Other users may download the smart card into volatile memory at each power up. The software provided to the user also permits users to alternate between indirect mediated interaction and direct interaction though a parallel connection after authentication is complete.

Type B 166 is through a custom application, e.g. Web server, that uses ESIP (E-Speak Inter-exchange Protocol (TCP/IP based) directly, e.g. e-speak's J-ESI SDK. It typically accesses PAMS for authenticated mediation and optionally other portal features, e.g. collaboration, through portal integration. System integration of this nature depends on actual implementations of the target system. Many commercial tools exist, e.g. Tibco, that facilitate such integration.

Type C 164 is a Net-enabled device that interacts with PAMS primarily for authentication and mediated messaging. Type C users will typically utilize authentication software of the type used by type A users. Typically PAMS end users use the browser for access, whereas PAMS service providers will prefer to use ESIP for system performance and programmatic flexibility.

The Web browser client would include WebFort's browser plug-in 170 and 172 to manage the issuance and update of software smart cards for the user. The plug-in interacts with Arcot's Card Server through PAMS implementation of Arcot's client APIs. After a smart card is issued, the browser interacts with the plug-in to decrypt challenge strings from authentication server using the user's private key embedded within the smart card. The user needs to enter valid personal identification number (PIN) for authentication when prompted for dialog to succeed.

Since all client access begins by being mediated by PAMS through e-speak, PAMS provides the "resource handlers", in e-speak terms, for all clients. The PAMS resource handlers monitor each user's mailbox for new messages and process them accordingly, e.g. converting them to user's database records. For Type A users, e-speak's Webaccess module implements the resource handlers. Other user types implement their own resource handlers, e.g. by serylet in a service provider case.

Clients secure communication with PAMS through SSL (Secure Socket Layer) as implemented in HTTPS. Both e-speak and WebFort support SSL.

Each type of user is represented by one block on FIG. 1 and many of the other figures, however it should be understood that there may be many users of each type utilizing a PAMS according to the invention and the drawing is simply representative of each type of user to illustrate how that user interacts.

One important observation in FIG. 1 is that communications of the PAMS Authentication Agent and Audit Agent with each other and outside entities(including the external Authentication Providers and Audit Providers) and users, are mediated by the e-Speak core.

A PAMS system, according to the invention, is preferably designed for scalability, performance, and availability as described below.

E-speak provides several key scalability features. PAMS services interact with one another mediated by e-speak Core messaging with ESIP, which is e-speak's Session Layer Security (SLS) protocol. One key feature of SLS is request multiplexing. Several requests can be serviced by a single TCP connection. Another e-speak feature is support for asynchronous mode of messaging; in fact, this is the default mode for e-speak messaging. In e-speak, synchronous messaging is modeled on top of the asynchronous implementation. Asynchronous messaging, with Inbox and Outbox concepts, is quite analogous to the Internet email system today. Therefore many users can use the system simultaneously sharing finite system resources such as threads and socket connections.

Since other components in PAMS are based on proven Web technologies such as Web and application servers, standard load balancing configuration can be applied to release stress points in the system thereby achieving system scalability. The typical load-balancing schemes in use are web server clustering and application server clustering. In web server clustering, the Web proxy server distributes requests among an active list of Web servers in a cluster according to in well-understood algorithms, e.g. round robin. In application server clustering, the application server proxy distributes workload across current active application servers, similar to Web server proxying. A typical load-balancing configuration is shown in FIG. 2.

Figure 2:
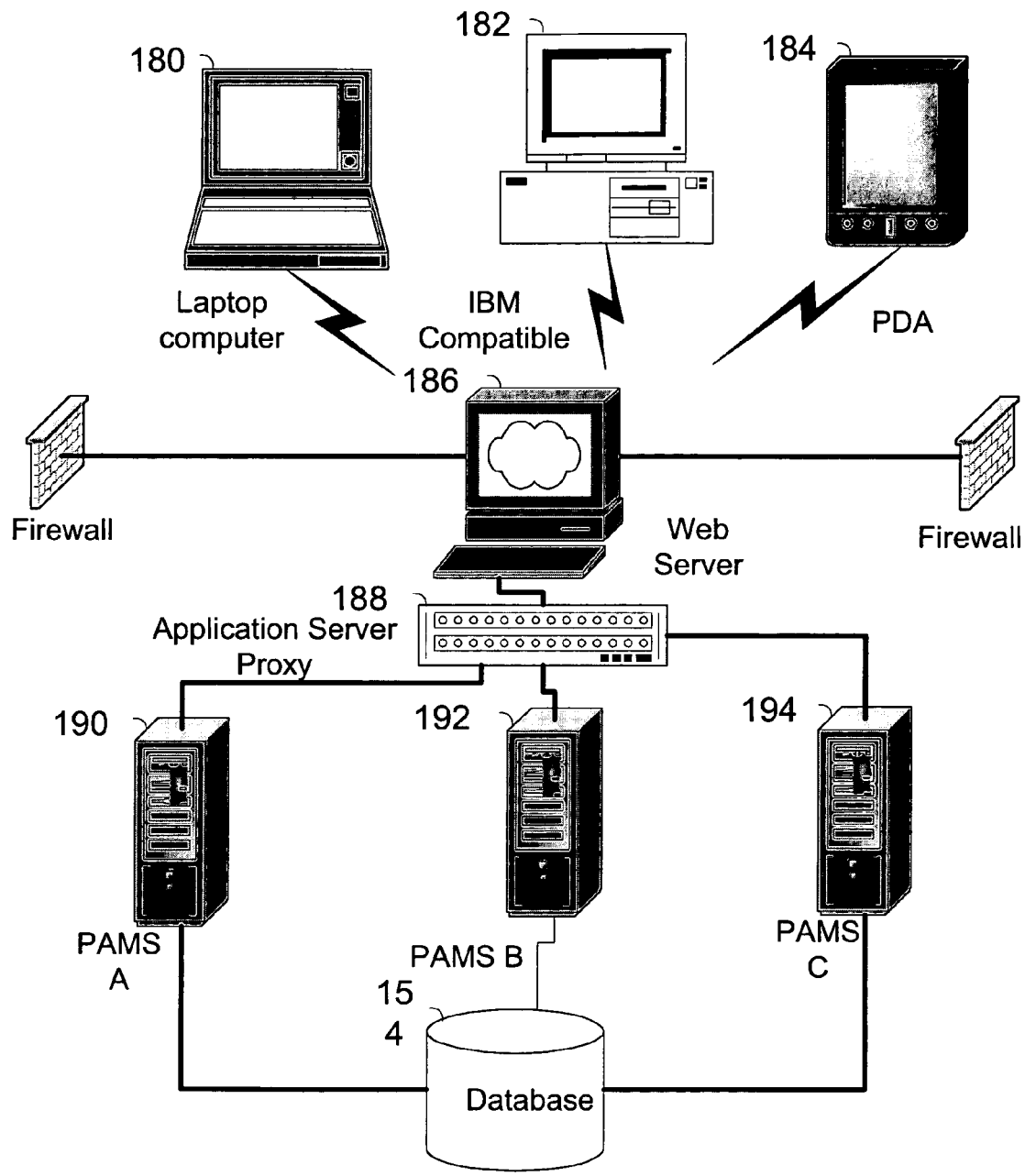
FIG. 2 is a diagram which shows a typical load balancing configuration of a PAMS system.

FIG. 2 assumes load balancing is a feature of the application server. In FIG. 2, several users 180, 182, and 184 are shown connected to a Web Server 186 which is connected to three instances of the same PAMS application module 190, 192, and 194 and the Database 154 through the application server proxy 188. The Web servers essentially load balance workload across a cluster of application servers, which host different instances of the same PAMS application module. In this example load balancing is a feature of the application server. Other schemes for load balancing include hardware load balancer based on ongoing IP traffic and Web server clustering that are based on request load on each of the cluster member server. A hybrid of the approaches can also be implemented based on the nature of the application work flow and network traffic patterns.

Another building block of PAMS, Arcot's WebFort, has provisions in its system design that conform to these standard load-balancing and clustering techniques.

The basis for system performance lies in ESIP, which is an optimized data transport specifically developed to handle e-speak traffic which is expected to support a heavily used web site. Performance-sensitive services use ESIP to communicate with PAMS. E-speak also provides a proprietary EIDL (see Appendix D of E-speak's Programmers Guide) compiler that generates stub files on top of ESIP for efficient programmatic access from clients to an e-speak service.

PAMS is to be deployed on high-end computer systems with fast Internet connections. Therefore, successive improvements in Internet router/switch technologies and computer systems, which has been taken for granted in today's marketplace, will help PAMS to perform under increasing workload.

E-speak Core architecture is designed for clustering, which is key to e-speak service redundancy. E-speak has built-in support to import/export resources between two connecting Cores and to keep the two systems in sync over time. Since PAMS is built on e-speak, it can leverage on the benefits of such cluster configuration of inter-connecting stand-alone or redundant PAMS systems. PAMS users can be configured to have access to more than one PAMS access point but maintains the same logical view of the service.

Due to its building foundation with e-speak, PAMS system design relies exclusively on Java technologies in interface definitions and connectivity with non-Java code through JNI (Java Native Interface)

Figure 3:
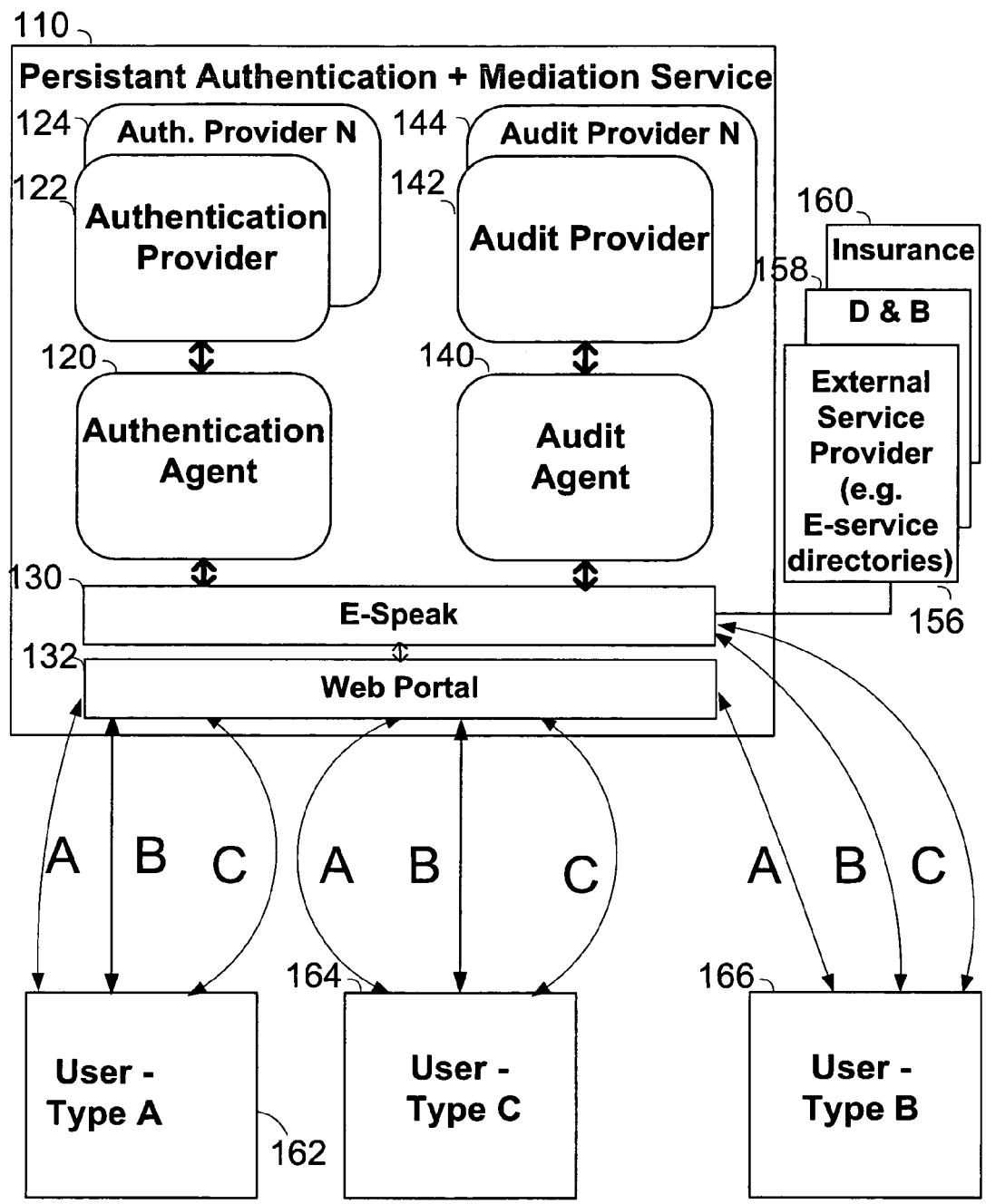
FIG. 3 is a block diagram showing the key process steps of a PAMS.

FIG. 3 shows the same implementation as in FIG. 1 showing the key processes of the PAMS, registration A, authentication, discovery and relationship development B, and collaboration C, all of which are applicable to each type of user. User type A 162 and user type C 164 access all process functions though the Web Portal, while user type B 166 accesses the E-speak core directly for authentication, discovery, relationship development, and collaboration. Note that in this and succeeding drawings the External Authentication and Audit providers and the PAMS Database are not shown but are preferably present.

Figure 14:
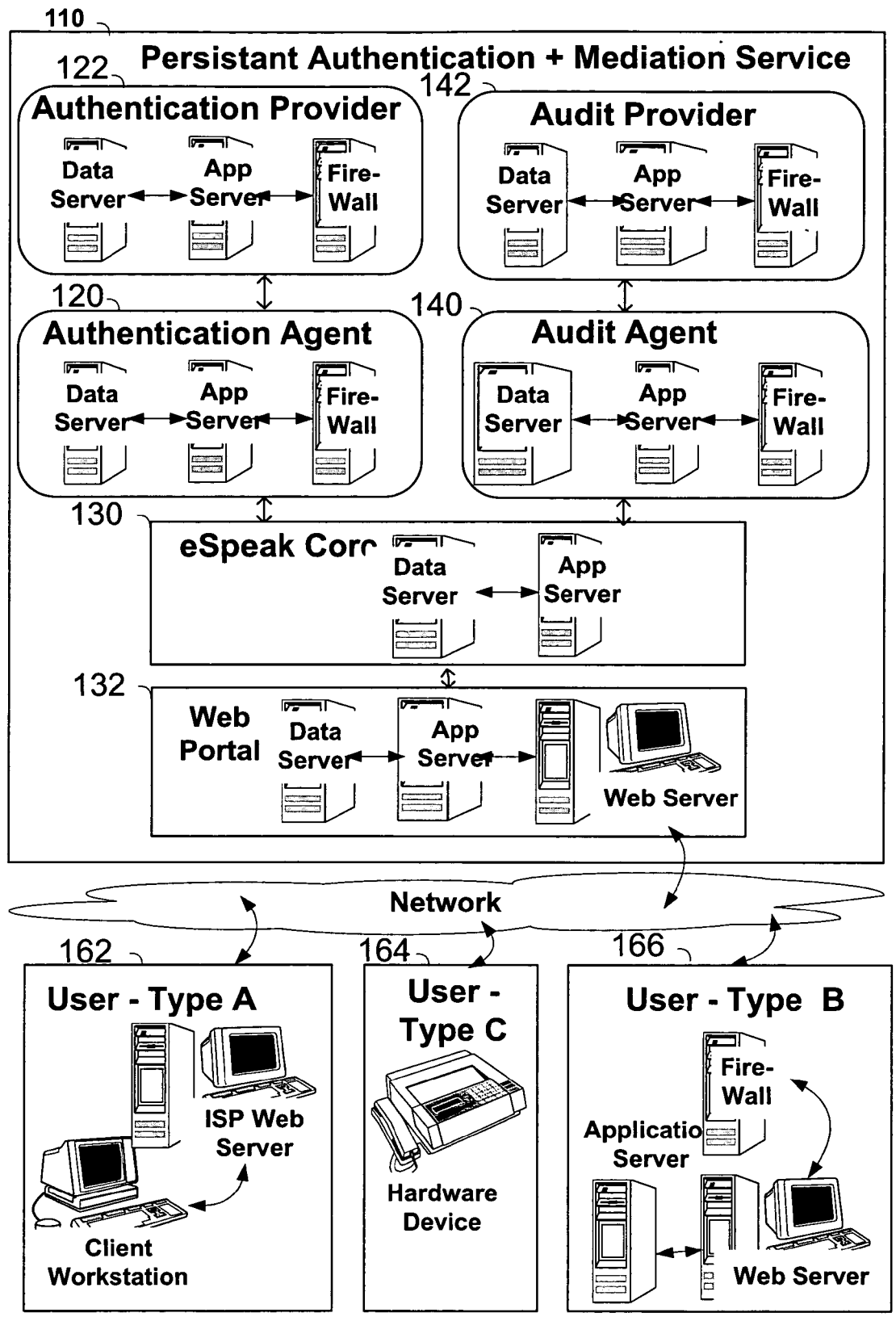
FIG. 14 is a drawing which shows typical hardware for a PAMS.

FIG. 14 shows a hardware configuration of the PAMS. Computers can be any standard network or Internet accessible machines. Preferable personal computers comprise 100 MB of hard disk space and 32 MB of memory and have common operating systems such as Windows 2000/95.

Preferred servers are standard web servers such as those manufactured by Hewlett Packard or Sun and preferably having a minimum of 100 MB of disk space and 256 MB of memory and operating under such operating systems as UNIX or Windows NT 4.0/SP4.

Key Processes

Enrollment Process

Figure 4:
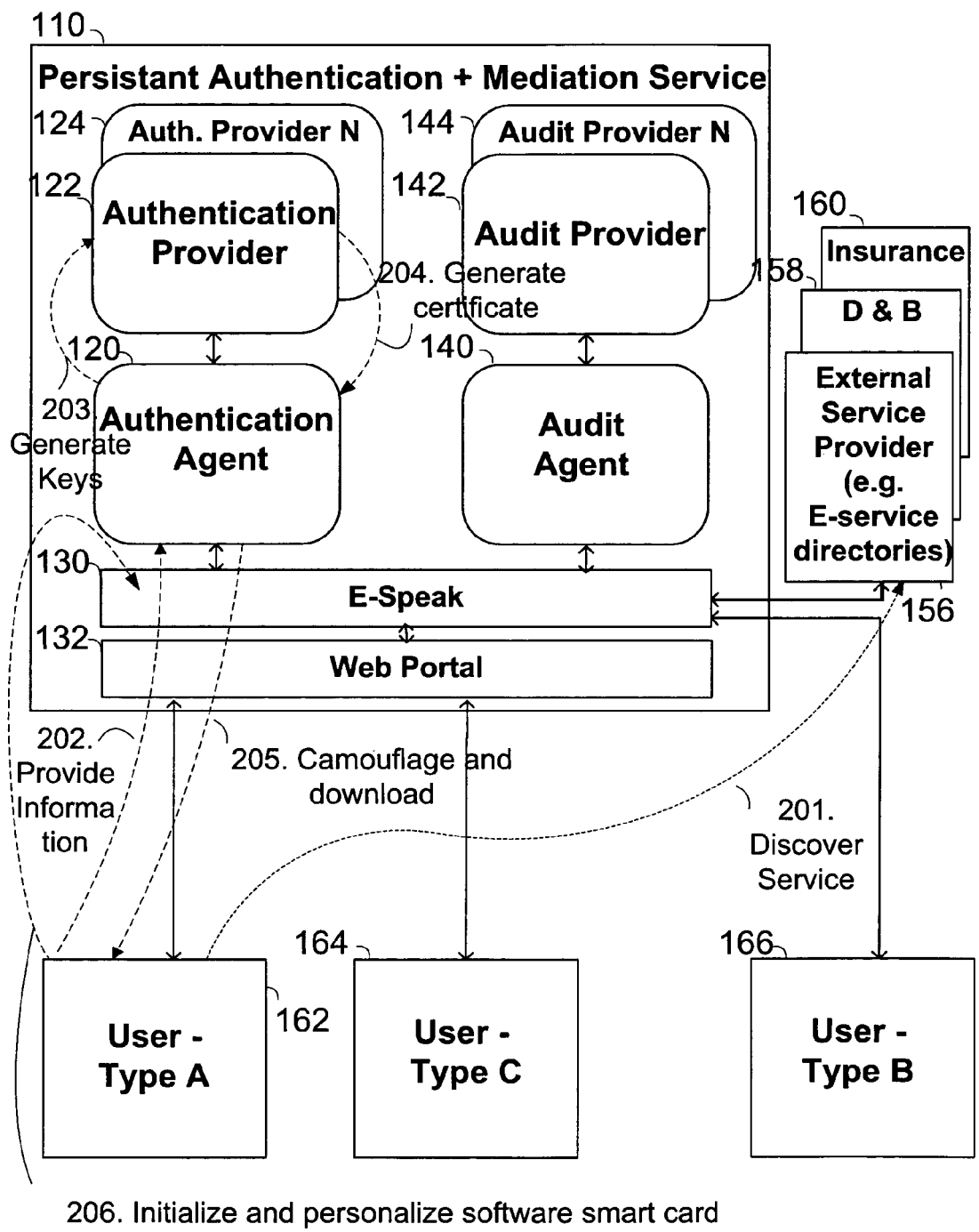
FIG. 4 is a block diagram showing the registration process.
Figure 10:
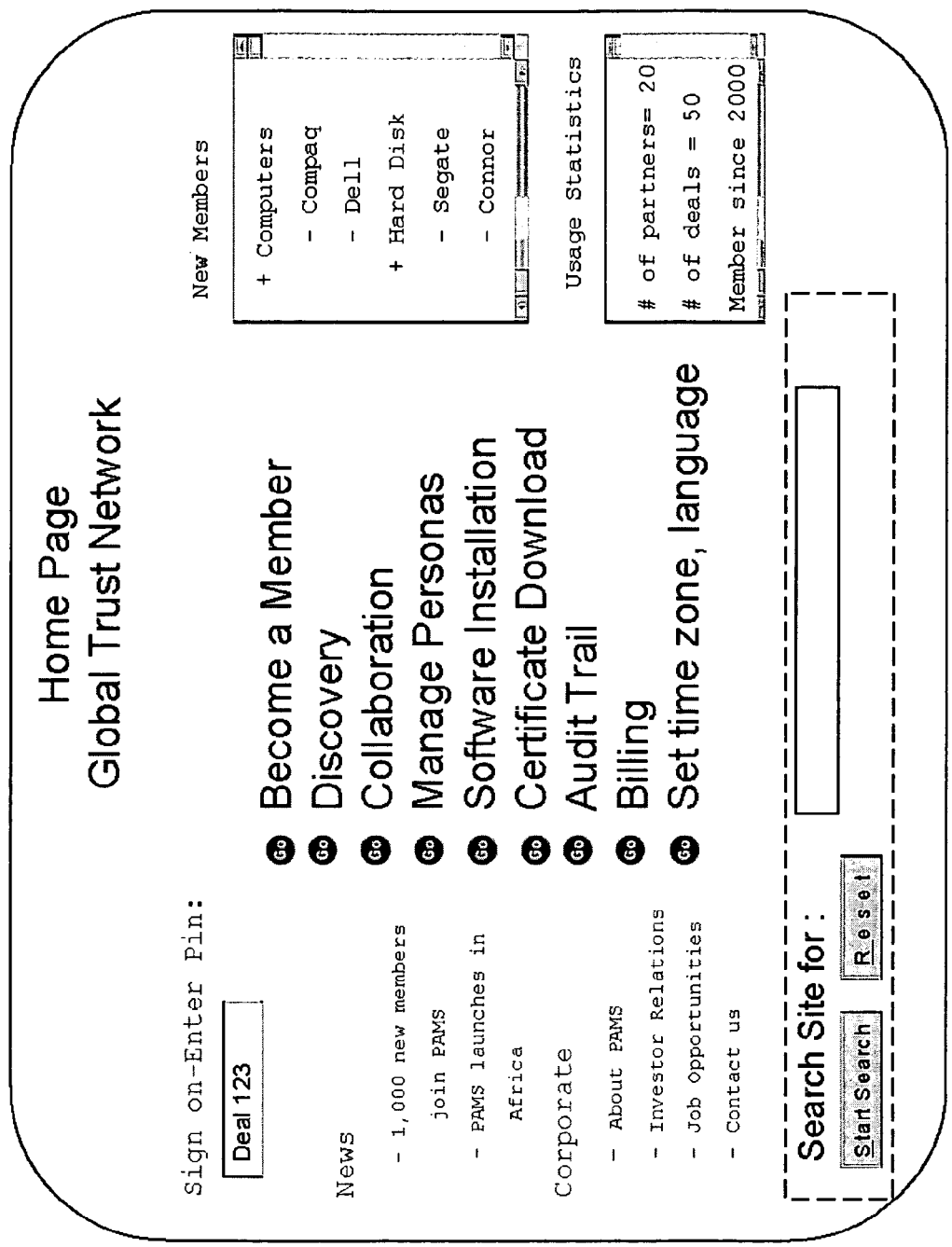
FIG. 10 is an exemplary Home Page for a PAMS.

Before businesses or users can use the PAMS they must be enrolled in the service. Enrollment applies to all three types of users, Type A (browser access), Type B (web application software on a server) or Type C (software Bot or device that sometimes has network connectivity). A single user can enroll, or a business or group comprising two or more users can enroll as a group. A business or group can be a combination of users of different types. FIG. 4 represents the enrollment process where in this example, a business, represented by an employee who is a Type A user, is enrolling. This user could enroll on behalf of itself and for other users. The user 162 would first need to find the PAMS. In this example, the user 162 issues a generic e-Service request from a web browser for a 'global authentication provider' through an e-Service broker (an e-Service broker is a class of service provided by Hewlett Packard which allows users to find e-Services) in the Internet connection line 201. The proposed business user selects PAMS if multiple service providers are returned by the e-Service broker. The business user clicks on the PAMS link and is connected through a URL to the PAMS home page (which is shown as FIG. 10) through connection line 202 accessing the Authentication Agent through the Web Portal mediated by e-Speak. The user 162 initiates the open account process with Authentication Agent by accessing the 'become a member' function on the home page. The business user is instructed to complete a number of online forms which provide specifics on the business and the employee(s) who will be enabled to utilized the PAMS service, such as their title and whether they can contractually commit the business. The business user will also be instructed to provide documents, which support the authenticity of the business such as SEC filings, etc. The business user will also personalize the service PAMS provides by selecting desired features from a list of available PAMS services. This includes specialized authentication providers, service level monitoring, authentication insurance, etc. Each of these services will have a different usage cost associated with them.

PAMS investigates the provided information. In the course of the investigation, PAMS may contact external information providers, such as Dun and Bradstreet to validate provided information. The business may be contacted multiple times to clarify existing or supply additional information Businesses that meet membership policies are notified that their registration has been approved. Otherwise, their application is rejected. An optional procedure would provide a fast temporary enrollment option to a user which has some degree of established identification, such as a DUNS number. The authentication rating of such a user would be low, warning other users of the temporary user's status.

If the validation process for a company is successfully completed, the Authentication Agent generates a public/private key pair(s), and encrypts the public key(s). The Authentication Agent controls the process of generating a software smart card for each employee of the business who is approved to utilize the PAMS.

In this case, for illustration, the user selected a specialized Authentication Provider (AP) 122 which includes insurance coverage as part of the authentication for an additional fee. The Authentication Agent then issues a request to AP1 through line 203 to generate the digital certificate(s) appropriate to that AP. The digital certificate(s) are returned to the Authentication Agent through line 204. Had the user selected to use the default authentication provider which is part of the Authentication Agent the certificate would have been generated within the Authentication Agent.

The Authentication Agent 120 camouflages the private key with an activation code, builds the software smart card(s) and places it in the software smart card database. The Authentication Agent 120 provides instructions to the Business employee 162 on how to pick up the software smart card and the required client software The Business employee 162 obtains the software smart card from the card database by downloading it; through line 205 from the PAMS home page (FIG. 10) by selecting "certificate download" after entering the appropriate activation code. Alternatively the user could secure the smart card through an out-of-band communication method such as a disk sent by registered mail.

The software smart card can be stored permanently on the PC hard disk or temporarily in the PC's memory. The Authentication Agent also provides the Business employee with the software plug-in necessary to interface with PAMS. The Plug-in is installed by accessing 'software installation' from the PAMShome page FIG. 10). In the case that the employee is enrolling Type B and Type C users the smart card and plug-ins are obtained by a Type A user and installed on the application server (type B) or device specific software.

The business employee 162 initializes the software smart card, through entering a user name, activation code and a user defined password and can personalize the software smart card through line 206 by entering non-validated information about interests, needs, etc. through the Persona Management Page (FIG. 12). The business employee can also create multiple personas, which represent subsets of the validated and non-validated information through the Persona Management page. Line 206 actually accesses the Authentication Agent through the Web Portal under mediation of e-Speak, though the line is distorted on FIG. 4 due to crowding.

Upon initialization, the routine Open-Account is executed by the PAMS which carries out administrative functions such as setting the Authentication Strength rating for the new member based on the amount of identity verification that was performed.

Authentication

Figure 5:
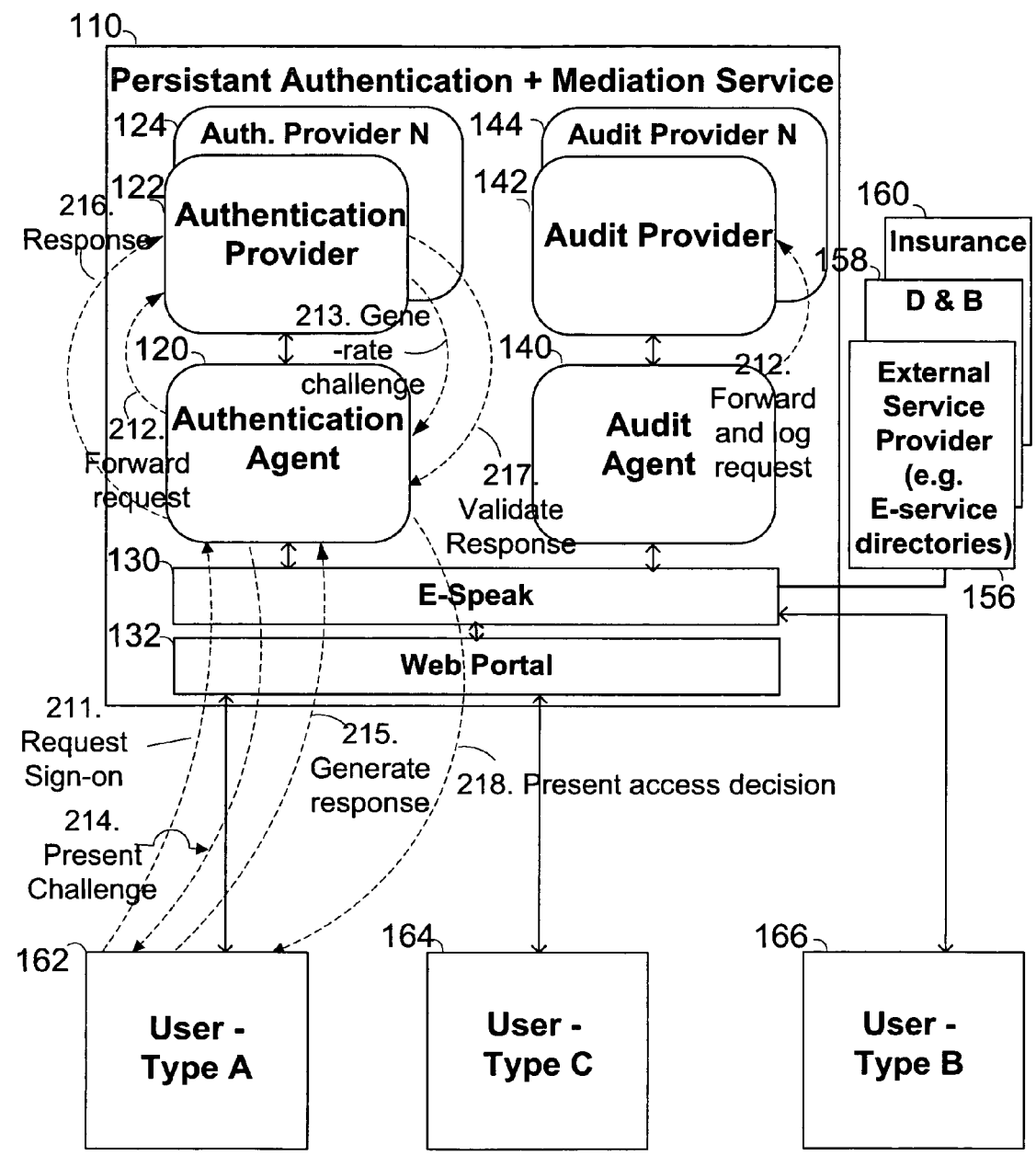
FIG. 5 is a block diagram showing the authentication process.

FIG. 5 is a diagram illustrating a Type A user 162 who is an employee of the business which enrolled in the PAMS in the prior example signs on (authenticates) to the PAMS. Referring to FIG. 5, a Type A user 162 requests the Authentication Agent to sign on by selecting "Sign-on" from the PAMS home page through line 211 which contacts the Authentication Agent through the Web Portal mediated by e-Speak. The Audit Agent 120 receives and logs the sign-on request. In this case user 162 has enrolled using external Authentication Provider 122 which issued the user's software smart card, so the Authentication Agent forwards a request for a challenge to Authentication Provider 122 though line 212. Authentication Provider (AP) 122 generates a challenge and forwards it to the Authentication Agent through line 213. The Authentication Agent presents the challenge to the user 162 by line 214. The PIN entry screen is displayed to the user 162, and the plug-in 170 which was supplied to the user during enrollment signs the challenge by encrypting the challenge with the user's private key. The signed challenge is returned with the user's digital certificate through line 215 to the Authentication Agent 120 through the Web Portal mediated by e-Speak. The response is forwarded to AP 122 through line 216. AP 122 verifies whether the response is authentic by decrypting the encrypted public key on the user's digital certificate and then decrypting the challenge and determining whether it is valid. The result of the verification is returned to the Authentication Agent through line 217 and then to the user through line 218. If the user's log in was validated a cookie is set in the user's browser and the user is routed to the Discovery Portal from where other users may be accessed. If the log in was not valid the log in procedure is repeated unless the maximum number of failures is reached.

An optional security feature would comprise notifying a user by some external means when it signed on to the PAMS. The notification could be sent to a mobile phone, pager, message service or the like.

Dynamic Discovery

Figure 11:
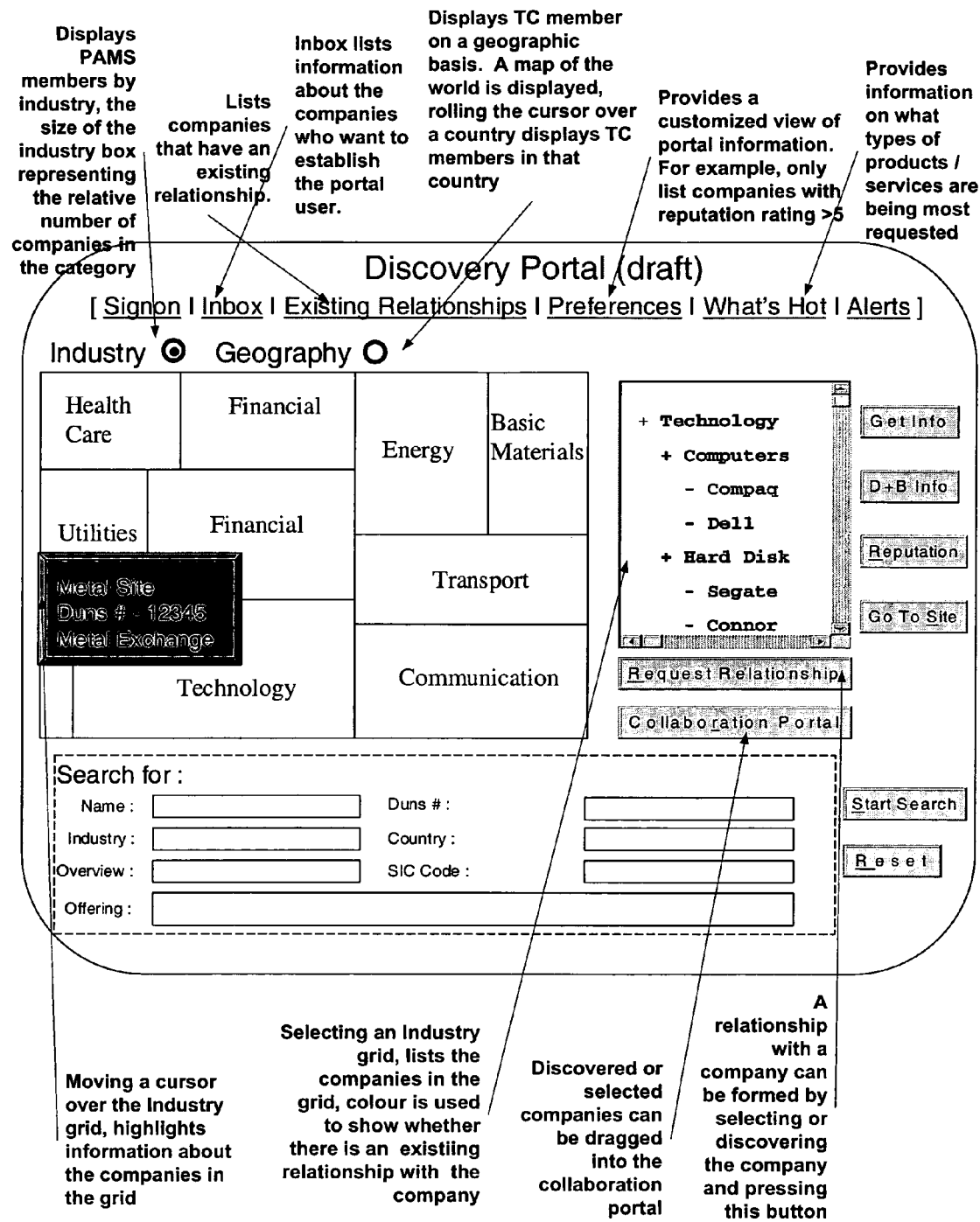
FIG. 11 is an exemplary Discovery Portal for a PAMS.

The dynamic discovery feature of the authentication service is one of the key elements of facilitating business transactions according to the present invention. It addresses the requirement to provide easy access to a dynamic directory of business members of the persistent authentication and mediation service. The feature is offered through a portal to Type A users and through equivalent direct communication with Type B and Type C users. FIG. 11 is a picture of a preferred discovery portal. The discovery portal organizes all the users and businesses into categories and allows sophisticated searching of the user and business data. Users can search both the authenticated data as well as data which may be dynamically inputted by businesses. This search is much different from an ordinary "web search" portal in that the data is dynamically variable and structured through a vocabulary. Also, all businesses are searchable, either directly or anonymously. The dynamic search feature is not limited to the common paradigm of browser users searching for web service providers.

Businesses and users may be searched dynamically according to search criteria, either searching authenticated data, user inputted data or both. An example of relevant user inputted data could include a business's current product inventory list, so that a buyer could select businesses who have sufficient inventory to meet their needs. Alternatively, a buyer could input its needs and be discovered by businesses who desire to bid on supplying the materials.

Users input user variable data through personas. Personas are managed through a Persona Management Portal which is shown in FIG. 12. Personas, like business cards, contain both personal as well as business identification information. Unlike business cards, users can personalize the persona to include information on interests, competencies, advertise goods or services with specified sale terms, etc. Users can also limit the information that is shared as the PAMS keeps the 'master' list of information private, and only reveals the information that the user has included in the persona. A new persona is created by selecting a subset of the master list of validated information and entering in appropriate non-validated information. Non-validated information can be entered into a validated category, though the information will be identified as being a pseudonym. For example, an employees company may be 'ABC', but they may not want to reveal their company name, so they enter 'XYZ'. The receiving party would be able to see that the company name is a pseudonym.

A user can request to make a relationship with another business through the Discovery Portal, either identified anonymously, or pseudonymously. The other business, or a user designated to make relationships will be forwarded the request along with authentication, either validated or anonymous as appropriate. The business could decide to establish a relationship, negotiate to have more validated information revealed or reject the request. If the businesses decide to a establish a relationship, their identities may be revealed to each other if not already known or kept anonymous depending on each users preference. A Type B business will be forwarded the necessary information to add the user requesting a relationship to its customer list so that the introduction process will not be needed in the future. Many businesses will accept all members registered with the persistent authentication and mediation service so that the introduction step will not be necessary for these businesses.

Browser users will receive requests to establish a relationship through the Discovery Portal. New requests will be waiting in the user's In Box. While the discovery features are described as being under individual control through a browser, it will be appreciated by those skilled in the art that the same features could be accessed directly by programmed applications including automated processes. Such processes might be particularly advantageous in global trade considering the differences in business hours. A business could update their needs or inventories by an automated process so that it could be found by another trade partner who would have confidence in the authenticity of the data being searched.

The discovery feature leads naturally to the next step in transacting global business collaboration with authenticated trade partners. The persistent authentication and mediation service includes software for secure collaboration. A browser user will conveniently begin to use the collaboration features by collecting businesses by "dragging and dropping" them onto the collaboration portal.

Figure 6:
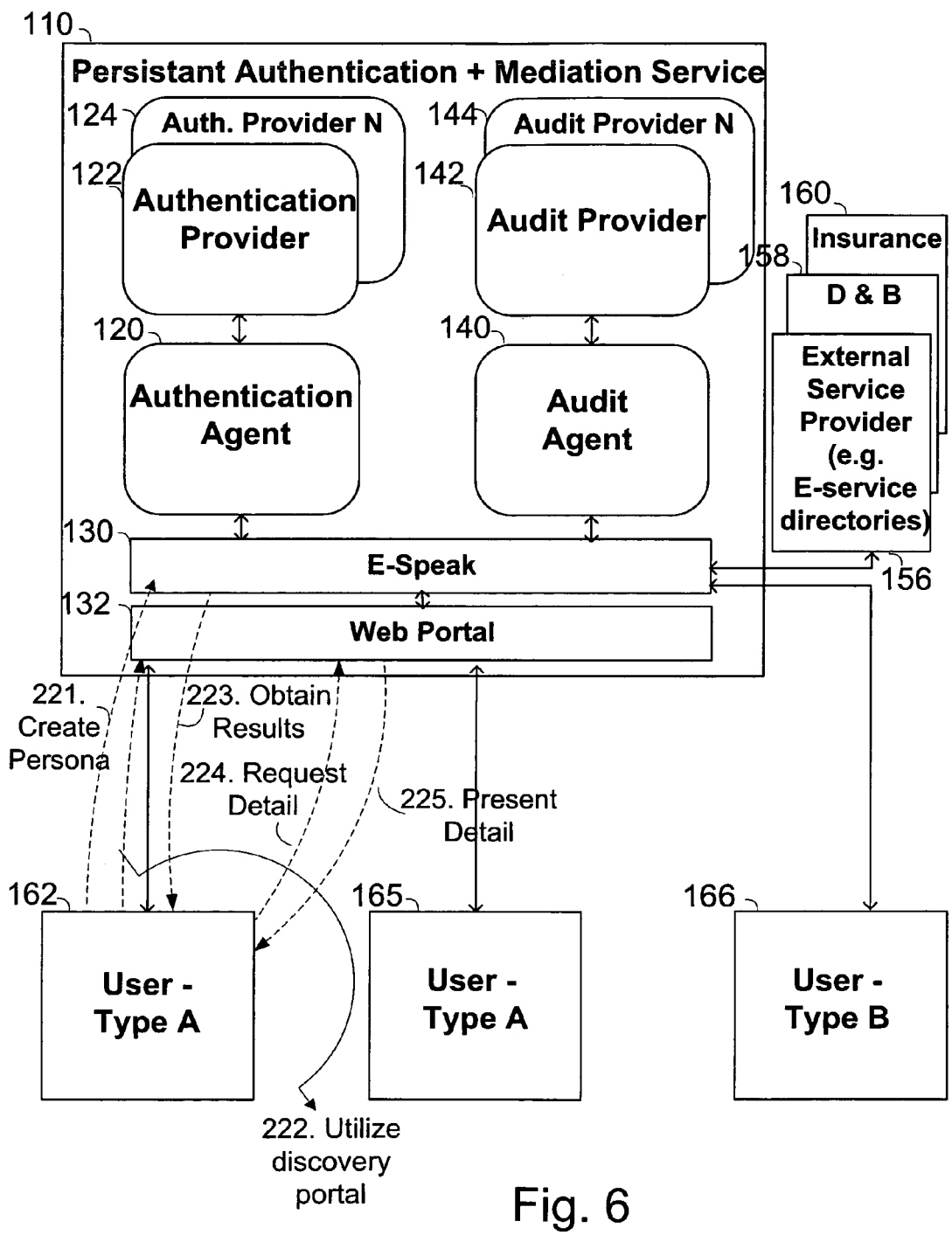
FIG. 6 is a block diagram showing the discovery process.

FIG. 6 is an example of the use of the dynamic discovery features to create a persona and discovers a second business. A Type A user 162 from the previous example, selects 'persona maintenance' from the PAMS Home page (FIG. 10) through conununication 221. The persona maintenance page is shown in FIG. 12. Personas, like business cards, contain both personal as well as corporate identification information. Unlike business cards, users can personalize the persona to include information on interests, competencies, advertise goods or services with specified sale terms, etc. Users can also limit the information that is shared as the PAMS keeps the 'master' list of information private, and only reveals the information that the user has included in the persona.

A new persona is created by selecting a subset of the master list of validated information and entering in appropriate non-validated information.

The PAMS provides default personas, such as a 'first time' trading persona, a 'long term relationship' persona as well as a anonymous persona which has validated information such as the dollar amount the holder can commit the business to but no information on the name of business itself.

When a persona is created, the user controls who sees the information and how much information is shared with a trading partner. Personas enable users to extract the maximum leverage from its trading partners as information asymmetry creates profit potential.

If a user needs to change his information, for example his mailing address, PAMS can update all businesses, that had previously received the information, of the change automatically.

The user 162 then accesses the Discovery portal from the PAMS Home Page (FIG. 11 shows the Discovery portal which is accessed through the Web Portal)) and enters desired search information in communication 222. In this case, the user 162 is interested in heavy equipment distributors. The user also specifies that only companies with at least a composite trust rating, as compiled by the PAMS, of four stars should be discovered. Unlike a conventional search engine, the user enters search text into a customized vocabulary which corresponds to the validated PAMS master data as well as the non-validated information.

The request is processed by the e-Speak core 130 which searches its repository of registered businesses for one or more that matches the search criteria and returns them through communication 223 to the user 162 through the Discovery portal a function of the Web Portal 132. Business 165, in this example, is returned as the best match to the query.

User 162 exercises the option to request additional detail on a discovered business beyond that which the e-Speak repository maintains through communication 224 and receives the result in communication 225. The PAMS reveals approved information on Business 165, such as a overview of the business, which PAMS maintains in its business database 154. The web portal retrieves the detailed data from the database 154.

User 162 will not directly access User 165, as their interaction will be mediated by the e-Speak core.

It is important to note that a business anywhere in the world who altered their persona information to mention that they are a 'heavy equipment manufacturer' just before the search would have been discovered. As soon as their profile is updated in the e-Speak core, the new business can be independently discovered by other businesses who are doing their own searching, or by automated type C businesses who continually search for certain attributes. This is another example of how the PAMS is a 'dynamic' service.

An option on the Discovery Portal is to provide information to allow members to view the 'discovery' requests that are most frequent. In this way, a business can dynamically alter their persona to increase the likelihood their product/service is discovered. Since a product/service overview can be part of the validated information, a business would have some confidence that the companies they discover can deliver. This is another example, of an action in one part of the system causing ripples to flow through the rest of the system.

Collaboration

Figure 13:
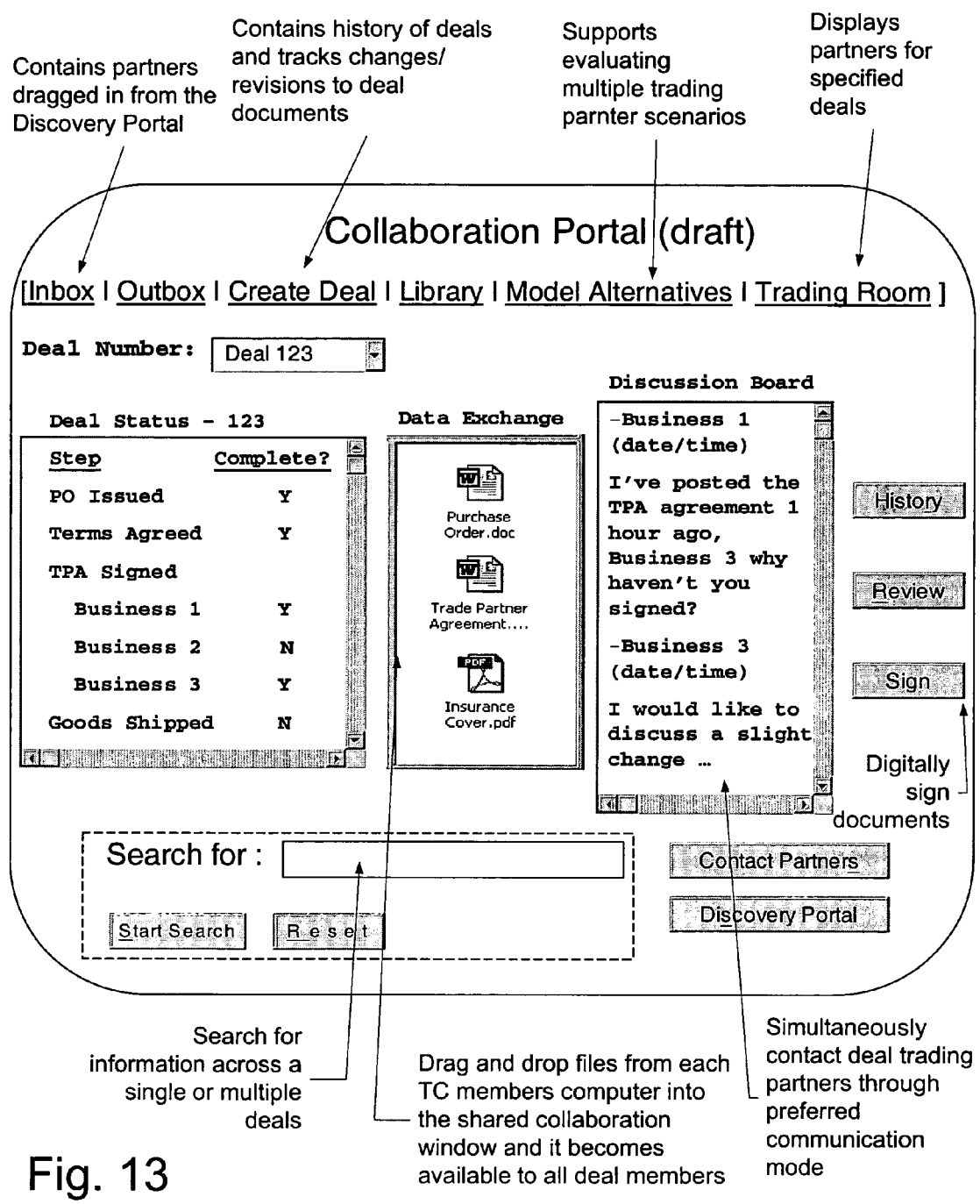
FIG. 13 is an exemplary Collaboration Portal.

The collaboration feature is the remaining key feature of the persistent authentication and mediation service according to the present invention. Referring to FIG. 13, the collaboration portal is a feature of the Web Portal. The collaboration feature is accessed by a browser user through a collaboration portal, though as with the other features it will be appreciated by those skilled in the art that the features could also be accessed directly by programmed applications including automated processes.

The businesses dragged in from the discovery portal will show up in the user's in box. The portal contains a Library which includes a history of deals completed and pending and tracks changes and revisions to the deal documents. A particular document may be pulled up from the Library or searched for from a database of all deals participated in. Since all transactions are mediated by the persistent authentication and mediation service, there is an archive memorializing all the deals. There is provision to exchange documents among parties and to digitally sign documents using the private key. Users may negotiate on a discussion board either in real time or by leaving messages on a discussion board, or other modes such as web-telephony.

One option of the service is to provide certified message delivery. Since all interactions are mediated by e-Speak until the message is delivered, PAMS can readily acknowledge when a document has been delivered and received.

An optional security feature of the PAMS is to confirm with an authenticated user by an external means that its digital signature is to be applied to a document. The notification could involve external means such as a telephone or mobile phone message, pager, or the like.

A particularly important feature of the authentication service according to the invention is that unlike prior discussion boards, all communications are fully authenticated by the persistent authentication and mediation service, so that all the participants know exactly with whom they are dealing.

Another important feature is that parties to a negotiation may add additional parties which are needed to complete a deal. For example, a buyer and seller of goods may bring in additional parties needed for handling, shipping, and insurance. Alternatively, a buyer could assemble alternative seller-handler-shipper-insurer combinations and compare them, all with surprising ease of process and security.

It will be apparent that the automatic processing option will be particularly interesting to many business transactions to supplement direct operation by an individual through a browser. For example, it will now be possible for a buyer of goods to use the persistent authentication and mediation service to assemble sophisticated alternative teams of suppliers of the goods coupled with providers of infrastructure such as handling, shipping, insuring and compare the costs of the alternatives. Because of the features of the invention the buyer complete the process entirely within the service with confidence in the authenticity of the responses, and with the ability to legally document all offers, terms, and acceptance with an efficiency previously unknown for secure transactions.

EXAMPLES OF BUSINESS PROCESSES USING THE INVENTION

Example 1

Forming a Relationship

Figure 7:
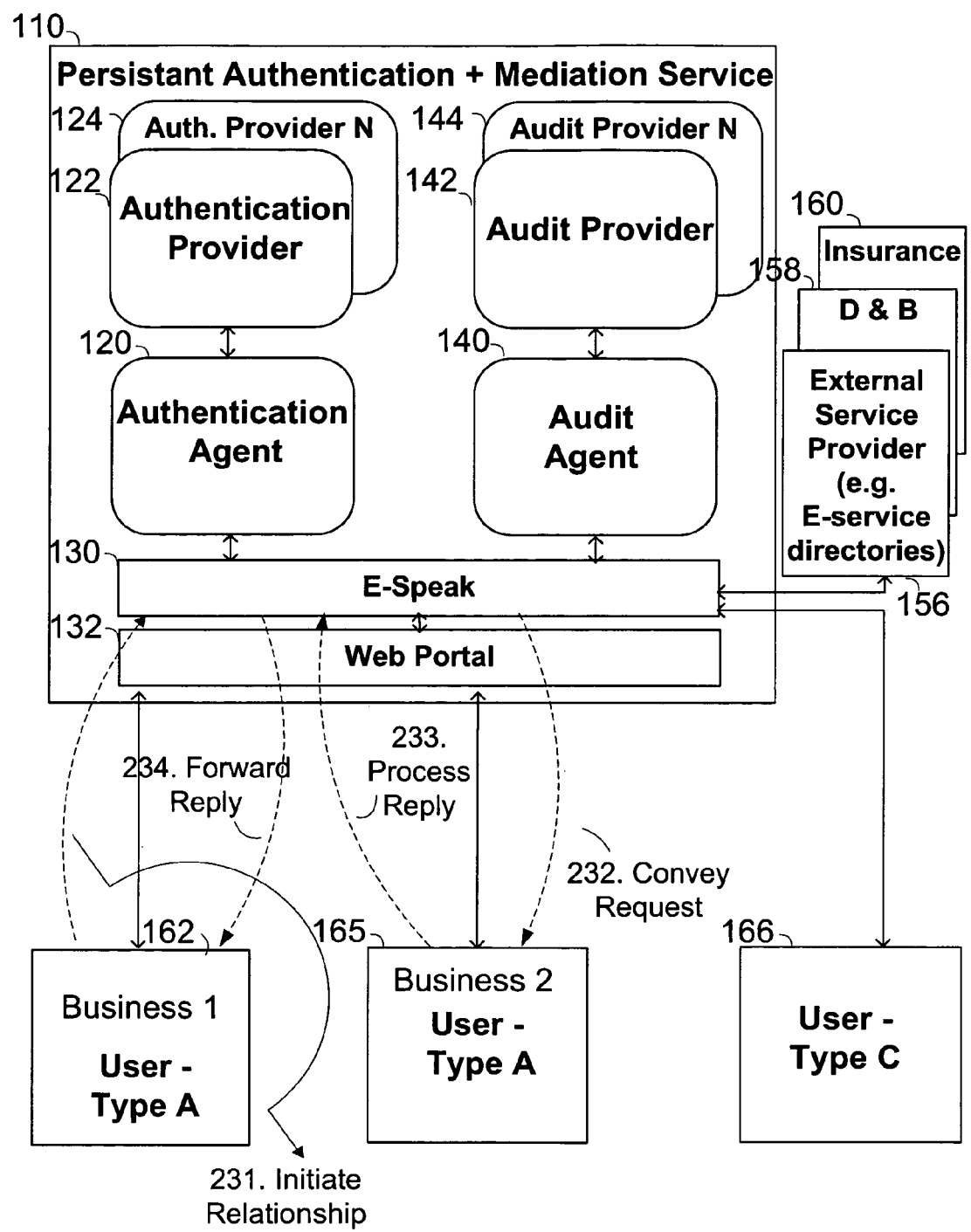
FIG. 7 is a block diagram illustrating the process whereby two users establish a relationship.

FIG. 7 illustrates the process whereby two businesses, Business 1 and Business 2 form a relationship.

Business 1 (162), a Type A user, uses the Discovery portal to review information about Business 2 (165), also a Type A user in communication 231. The Discovery feature is accessed through the Web Portal which calls on the e-Speak dynamic discovery feature. Business 1 in this case is able to review Business 2's access policy and notices that relationships are restricted to businesses that meet specific criteria, in this case having annual sales of over $10 million. Business 1 specifies that it would like to be introduced to the distributor, Business 2, by selecting the 'Request Relationship' function from the Discovery Portal.

The Discovery feature conveys the request to Business 2 by placing a message in Business 2's in box in communication 232. Business 2 is provided with the information present in the active persona of Business 1.

Business 2 replies that they desire a relationship with Business 1 in communication 233. PAMS updates its database to show that a relationship has been established between Business 1 and Business 2. The Web Portal relays this information to Business 1 in communication 234. Business 1 may now send a message to Business 2. Business 1 can send digital messages to Business 2 and they can collaborate through the collaboration page.

In this example Business 2 had previously signed up with the PAMS. Business 2 decided not to allow all PAMS members to do business with them, as they only want to deal with companies possessing certain characteristics. Otherwise Business 1 would have been able to directly access Business 2 upon discovery.

Business 1 could desire an anonymous relationship in which case the persona would convey minimal information. Business 2 may decide to deal anonymously with Business 1 or may request additional information be provided in order to establish a relationship.

An advantage of the invention is that Business 2 benefits from an accelerated customer acquisition process. For example, Business 2 can establish an immediate approval profile based on the information the PAMS provides, Business 2 can immediately authorize the addition of a new customer since it can rely on the PAMS to ensure that the new customer satisfies the criteria of its immediate approval profile.

Business 2 in this example, is a browser user responding to a message received through the Discovery Portal. Business 2 could have alternatively been a Type B user such as a web site, responding in an automated manner to Business 1's messages. It could also alternatively be a Type C user such an application program, software bot, or device. If Business 2 had been a Type B user, after establishing a relationship, Business 2's web site access tables would have been updated by Business 2 to allow Business 1 access to the web site without needing to go through the typical web site sign on screens.

Business 1 does not directly access Business 2 through the PAMS as their interaction is mediated by the e-Speak core.

An implication of the relationship building process carried out by subsets of the PAMS membership which have formed relationships with each other, is the creation of virtual communities of trust which exist within the broader PAMS enrolled users.

Example 2

Three Businesses Collaborate

Figure 8:
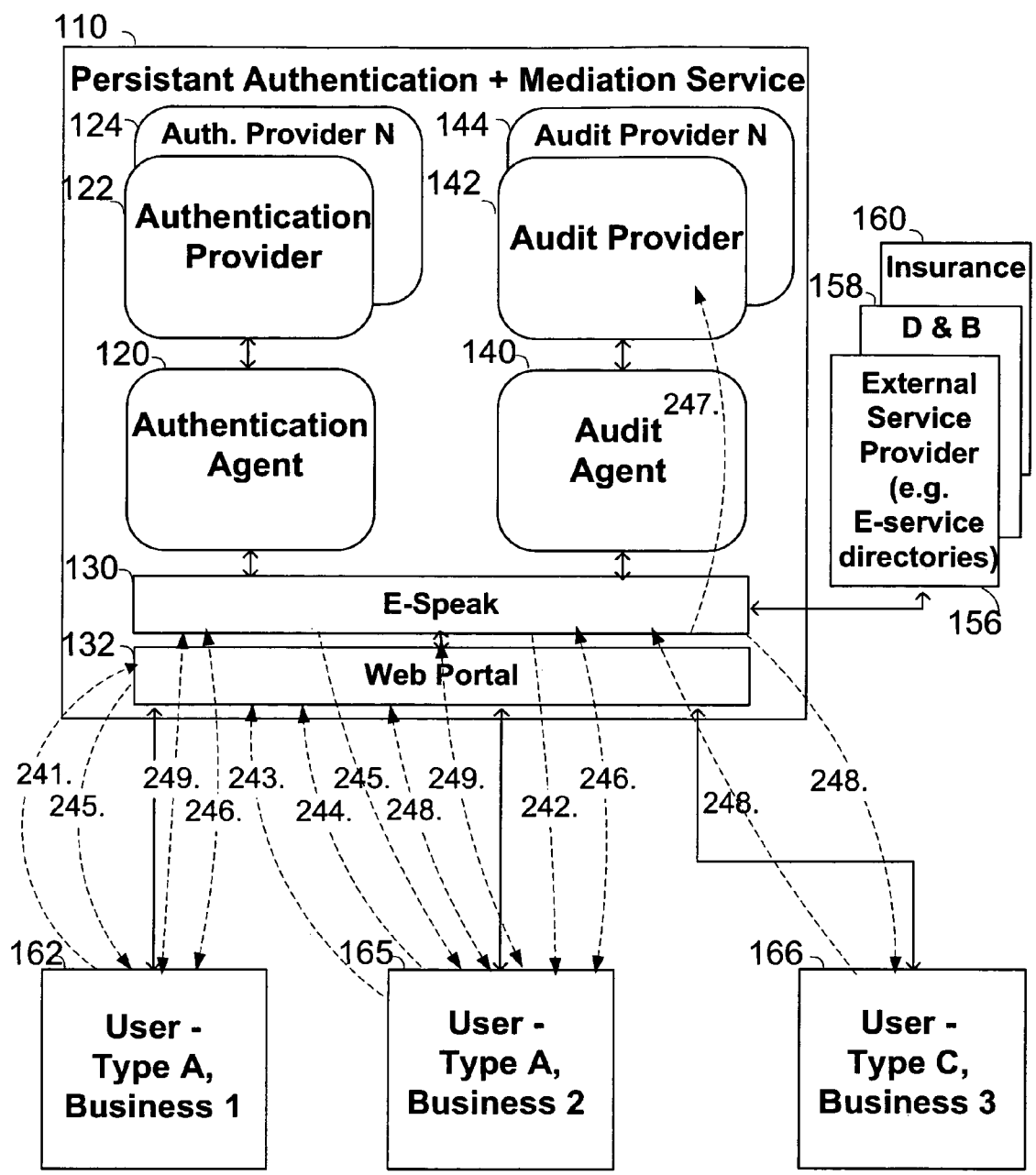

Referring to FIG. 8, Business 1 (162) and Business 2 (165), both Type A users, have created a relationship as described previously in Example 1. In communication 241, Business 1 (162) initiates an collaboration session with Business 2 by selecting the "Collaboration" feature from the Discovery portal which causes the Collaboration Portal to be displayed by the Web Portal. Business 1 notifies Business 2 by selecting 'Contact Partners' from the Collaboration portal and selecting Business 2. In communication 242 a message is sent to Business 2 Discovery Portal's 'Alert' function, and/or to a mobile device, etc. which Business 2 has designated.

In this case these two businesses want to conduct a trade in which Business 1 is the buyer and Business 2 is the seller. Both parties have already signed onto (authenticated to) the PAMS.

When Business 2 accesses the Collaboration Portal it can exchange messages and documents with Business 1. In the communications labeled 243, Business 2 specifies that it wants to receive an assurance from a financial institution that Business 1 is credit worthy before concluding the contract and Business 1 and 2 agree to split the fees for the financial institution and to choose a financial institution that both organizations approve.

In communication 244, Business 2 accesses the Discovery Portal and issues a search request for a "credit rating agency".

Business 1 and 2 both receive back the information which was discovered, in parallel communications 245, in this example identifying two potential service providers (D+B) and (@rating) as credit rating agencies.

After reviewing meta-data about the two rating services, Business 1 and Business 2 agree to utilize Business 3, @rating, which is a software application (a Type C Business). The discussion is shown as parallel communication lines 246, which is a communication between Business 1 and Business 2, mediated by e-Speak 130. This agreement is captured in the discussion forum feature of the collaboration portal and logged in a permanent audit record in the communication labeled 247 between e-Speak and Audit Provider 142 through Audit Agent 140. Audit Agent 140 continuously monitors e-Speak for events to be memorialized in the permanent record.

While the selection process described in the example has been kept simple, it would have been possible to have found additional providers and compare them according to complex criteria, such as price, capability, response time, and the like.

In the series of communications labeled communication 248, Business 2 accesses Business 3's e-Service 166 under mediation of e-Speak. Since Business 2 has already authenticated to the PAMS, and Business 3 allows access to its service to authenticated PAMS users, Business 2 did not need to go through Business 3's sign on procedures to obtain the credit report.

In the pair of communications labeled 249, Business 1 and 2 discuss the credit report and once satisfied with Business 1's credit standing, Business 2 distributes a Trading Partner Agreement (TPA) to Business 1. Business 1 agrees to the contractual terms and conditions stated in the TPA and digitally signs the agreement. Business 2 digitally signs Business 1's purchase order. Deal documents are stored in the PAMS deal library, memorialized by Audit Provider 142.

Having utilized Business 3's service Business 2 could express an evaluation of the quality of service provided through the collaboration page. This evaluation would be part of Business 3's overall evaluation compiled by the PAMS.

In this example, Business 3 is software application, e-Service, it could also be a web site, or a human utilizing a browser. It is an important feature of the invention that a human user utilizing the discovery or collaboration portal could interact with a mix of automated and human counterparts.

The Collaboration portal is used to simultaneously interact with businesses for the purpose of completing a trade. The Collaboration Portal supports multi-company discussion through a discussion board, web-telephony, etc. The Collaboration portal provides a central point to manage the key process steps involved in concluding a trade. The Collaboration portal is an application maintained by the Web Portal.

Although a business may be unfamiliar to another business, they are willing to trade with unfamiliar partners because of the PAMS's assurance that they are dealing with an authentic business, with known characteristics. Once a business logs onto the PAMS, it becomes part of an integrated community. Businesses of Type A, B or C can assume that anyone accessing their sites/applications has already be authorized by the PAMS, therefore, the business itself does not need the overhead of a separate authentication mechanism.

Example 3

Figure 9:
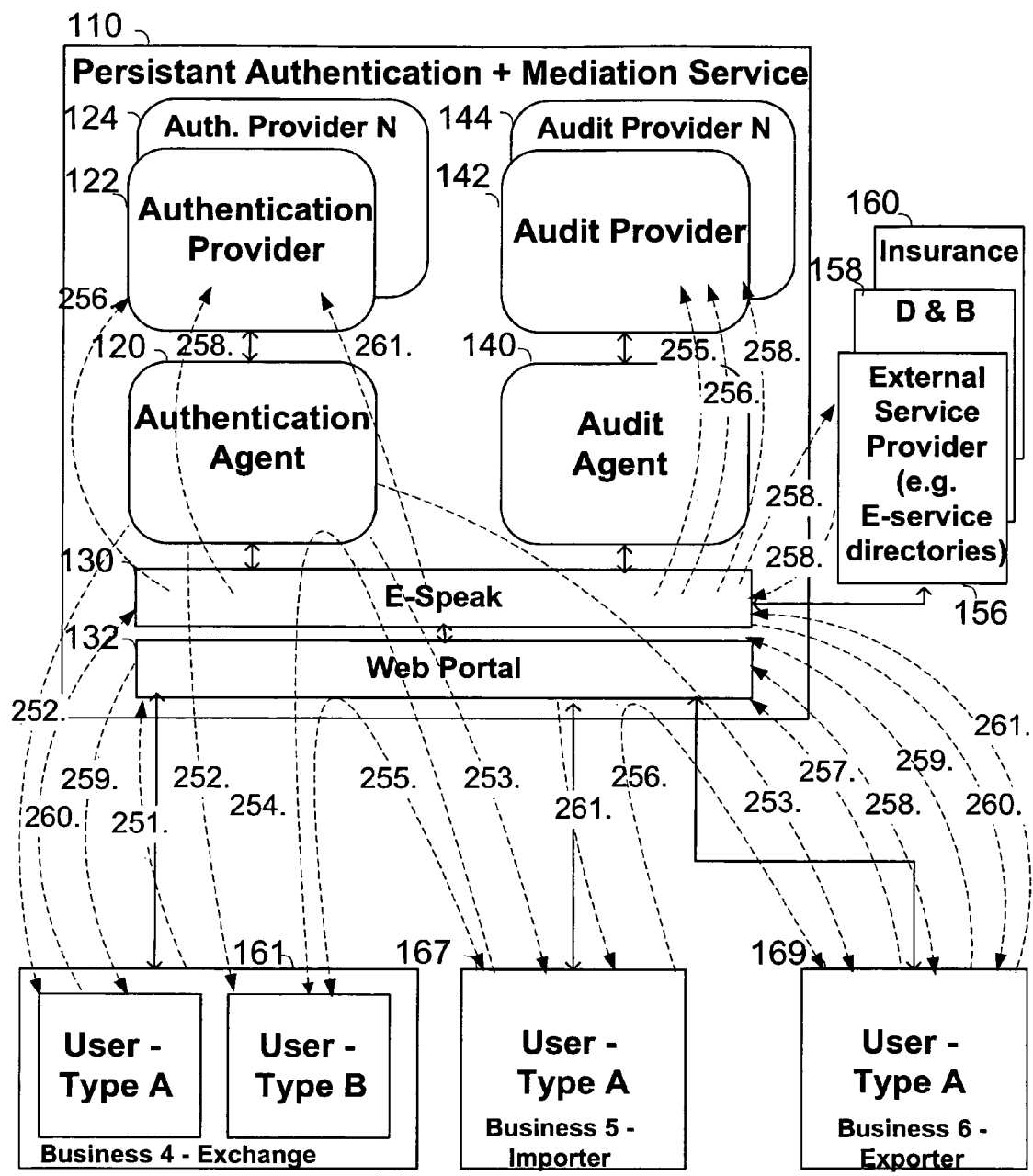
FIG. 9 is a block diagram illustrating an application of a PAMS to an exchange (Example 3).

An Exchange Outsources Authentication to the Pams and Signs Up all its Business Customers Referring to FIG. 9, in this example an exchange 161 selects the PAMS to provide services to its business customers. In this case, the exchange comprises both a User Type A (it is able to interact with PAMS members through a browser) and a User Type B (its web site uses PAMS for access control).

The Exchange initiates the open account process with the PAMS by accessing the 'become a member' function on the PAMS's home page in the communication labeled 251. The Exchange opens an account with the PAMS, it provides all the information necessary for enrollment. The Exchange is instructed to complete a number of online forms which provide specifics on the Exchange and the employee(s) who will be enabled to utilized the PAMS service. The Exchange is also instructed to provide documents, which support its authenticity such as SEC filings, etc. The exchange also provides information on its customer base to allow the PAMS to determine whether it will be able to accept all the exchange's customers as members. The PAMS investigates the provided information. In the course of the investigation and the Exchange may be contacted multiple times to clarify existing or supply additional information. Customers may also be approached individually to provide any additional required information. The processing steps of the customer joining the PAMS follows the enrollment procedure as previously described.

An Exchange that meets membership policies are notified that their registration has been approved. Otherwise, their application is rejected.

The approved Exchange will personalize the service that the PAMS provides by selecting desired features from a list of available PAMS services. This includes which Authentication provider(s) its customers will utilize, whether the Discovery/Collaboration portal will be utilized by its customers, whether their customers are discoverable by other PAMS members, whether their customers can use personas and interact anonymously, obtain authentication insurance, receive service level analysis reports, etc.

In this case, the exchange just requires authentication and the ability to 'private label' the Discovery and Collaboration portal. Private labeling utilizes Frame-in-Frame techniques, to make the Discovery portal appear to be coming from the exchanges site in appearance, while actually being executed from the PAMS web server.

The Authentication Agent electronically provides the exchange with software necessary to authenticate its businesses and collaborate through a web browser in communication 252. After installation the interface is tested.

The Exchange's customers receive required software smart cards and the software needed to authenticate to the PAMS. Business 5, an importer 167 and Business 6, an exporter 169 are shown receiving their smart cards and software electronically in communications labeled 253.

Business 5 (167) an importer of textiles, has previously received his smart card and software. Business 5 is a Type A user. The importer signs on to the PAMS by accessing a PAMS home page that has been customized for the Exchange and the Exchange admits Business 5 to enter its site if authentication is confirmed following the procedure which has been previously described. The sign on and authentication process is shown as communication 254 which passes between Business 5 and the exchange web site through the Web Portal, e-Speak and the Authentication Agent.

In communication 255, shown as a communication between Business 5 and the Exchange web site through the web portal 132 and mediated by e-Speak 130 and recorded by Audit Provider 142 through the Audit Agent 140, Business 5 uses the Exchange's matching services to select a business partner, in this example, Business 6 (169), which is an exporter of textiles—a Type A user.

The importer, Business 5 issues a Purchase Order (PO) to the exporter, Business 6 using the PAMS Collaboration Portal. Business 5 digitally signs the PO. This transaction is shown as communication 256 proceeding from Business 5 to Business 6 through the Web Portal and mediated by E-Speak. The signing is accomplished by Authentication Provider 122 The transaction is recorded by Audit Provider 142 through Audit Agent 140. The PAMS stores the PO in a deal folder. When the PO is delivered to Business 6, the PAMS sends a confirmation to Business 5 that the PO was delivered and received.

This illustration illustrates an important feature of the Persistent authentication and mediation service, that all communications among the Exchange 161, Business 5 (167) and Business 6 (169) are mediated by the PAMS, whose Audit Agent 140 monitors the transaction, compiles an audit trail, and makes information from the audit trail available to the interacting parties.

The exporters processing policy specifies that before confirming the PO, online verification that the receivable can be immediately sold is required. The exporter, Business 6 (169), uses the Discovery portal to discover a factoring company to provide a cash advance against the future receivable and the request is conveyed to external provider 156 in communication 258 from Business 6 to External Provider 156.

The factoring company 156 reviews the transactions deal file, checks on the credit worthiness of both the exporter and the importer, reviews the reputation ratings and determines whether the transaction meets the factoring companies acceptance policy guidelines. In this example, the factoring company returns a digitally signed commitment that they will purchase the receivable once the goods are shipped in communication 258, which is forwarded to Business 6 (not shown for legibility). An audit record is made of the commitment which is stored in the deal folder.

This step again illustrates the mediation feature of the invention. In this case the PAMS Audit Agent creates a record which is forensic evidence that the exporter properly followed policy and the financing check was actually done.

Business 6 then uses the collaboration portal discussion board to request clarification on the Exchanges transaction procedures in communication 259 and the Exchange uses the Collaboration portal discussion board to clarify their processes. The exchange is shown as communications 259, from Business 6 to the Exchange mediated by e-Speak and the exchange's reply shown as communications 260.

Now that financing is assured, all of the exporters policy steps have been completed. Communication 261 shows Business 6 sending the importer a signed PO confirmation. The signing is accomplished by Authentication Provider 122. The Audit Agent 140 who is monitoring e-Speak picks the signed PO for memorialization and sends it to Audit Provider 142 (step not shown for legibility). Business 5 receives the confirmation in a communication 261. Business 6 prepares the goods for shipment.

This example illustrates the important persistent mediation feature of the invention. The PAMS has the ability to produce the persistent evidence that not only were the transactions signed on a particular time and date, but the entire transaction was monitored and documented at each step along way to the deal, the buyers, sellers, and third parties processes were met.

As a consequence, when a party signs a document, as well as acknowledging the document, there is a record that all of the required intermediate steps were completed. In this way, a legal transfer of risk/goods can be affected.

Non-repudiation is made possible by the forensic evidence that's collected which documents the commitment of the deal parties. A review of the transactions audit trail supports the ability to ensure the transactions meet each party's policy requirements.

In the preceding example, the Exchange caused its customers to be enrolled for a subset of the complete service provided by the PAMS. An Exchange customer could also sign up independently of the Exchange and have access to all the PAMS services.

Similarly, the Exchange could decide to form a relationship with another business member of the PAMS. For example, to allow the business member to have access to the Exchanges services without having to sign on (the same process is utilized as when establishing a relationship between any two businesses).

Detailed Registration Procedure

An overview of the enrollment process for registering a business with PAMS has been previously described and illustrated in FIG. 4. A more detailed explanation follows.

Referring to FIG. 4, three types of Authentication Providers are supported by PAMS: First, the default AP which resides in PAMS Agent (120).

Second, PAMS is designed to work with specialized AP's (122–124). An AP can specialize, for example, in authenticating mobile users, or in providing authentication insurance to users. AP's act as Certificate Authorities (CA) as long as they are certified and support standard X.509v3 certificates.

Third, PAMS can interface to a businesses existing CA to generate software smartcards containing the user's certificate again, as long as they are certified and support standard X.509v3 certificates. The businesses CA acts as a specialized AP.

External authentication providers are registered to the e-Speak repository (130) by PAMS Agent and must adhere to the PAMS's standard e-Speak contract.

Registration is Composed of a Number of Functions:

1. Discover Service. Multiple brokers could be utilized. For example, HP provides a directory to facilitate locating e-Services, in addition, UDDI standards are under development by Microsoft, IBM and Ariba to outline a registry, transaction rules and a business service directory for B2B commerce. PAMS's home page is located on the PAMS web server 2. Provide Information. Registering to PAMS and obtaining a software smartcard involves the completion of registration forms, which are located on the PAMS web server. Information entered on the forms is validated to ensure its accuracy. Validation can take many forms and involve many sources of information. For example, if Dun and Bradstreet are used as a trusted third party for company information, validation may consist of verifying the company's web server application is associated with a particular Internet IP address, and the name has been assigned to it by Internic. In addition to providing data online, registration requests by individual companies need to be supported by a written application provided on company letterhead, and signed by an officer of the company. Under certain circumstances, a system administrator from a company who is registering its employees, may be given the ability to enter data about its employees into PAMS'registration system 3. Generate keys. If the validation process for a company is successfully completed, The Authentication Agent generates a public/private key pair, and encrypts the public key. The Registration Authority (RA) within the Card Personalization Server, located on the application server in the Authentication Agent (as shown on FIG. 14) generates a public/private key pair and then encrypts the public key. The Authentication Agent sends the keys to the selected Authentication Provider.

4. Generate Certificate. The Authentication Service Provider invokes the Certificate Authority within the Card Personalization Server to generate a digital certificate. A default ASP exists internally to The Authentication Agent, though the PAMS design allows for external AP's to register themselves with PAMS. External AP's communicate with PAMS through e-Services via the Internet or through a private network. Companies can choose for its employees which the AP it wants to utilize. For example, if a company has 1,000 employees, the company may want to issue cards that have limited functionality, but can authenticate at a low cost to most of its employees, some employees many be issued cards that support roaming, at an additional cost. Employees that can contractually commit the company may require a card that provides authentication insurance or longer key lengths. PAMS can generate software smart cards individually or in batch mode by utilizing WebFort's "Batch Utility".

5. Camouflage and Download. The Authentication Agent then camouflages the private key using an activation code and places the software smartcard in a card database on the database server. The business employee obtains their software smart card(s) by accessing the card database from the PAMS Home Page. Each employee of Type A downloads the client software plug-in from the Database server required to make use of the PAMS service. Type B businesses, need to download the server application from the Database server to the server on which the businesses application resides that PAMS will be authenticating access to. Type C businesses will either download the plug-in or a app-let depending on the type of device PAMS will be authenticating. Once the software has been downloaded it is installed.

6. Initialize and Personalize the Smart Card. The business employee activates their software smart card(s) by accessing the card database from the PAMS Home Page and entering their user name and activation code. The employee picks a personal identification number (PIN) for the card(s). The business employee can personalize the software smart card by entering non-validated information about interests, needs, etc. The business employee can also create multiple personas, which represent subsets of the validated and non-validated information Upon activation, OpenAccount is performed by PAMS to add a new entity to the customer data base, the e-Speak repository and to invoke the Audit service.

PAMS Normal Request Workflow

Figure 15:
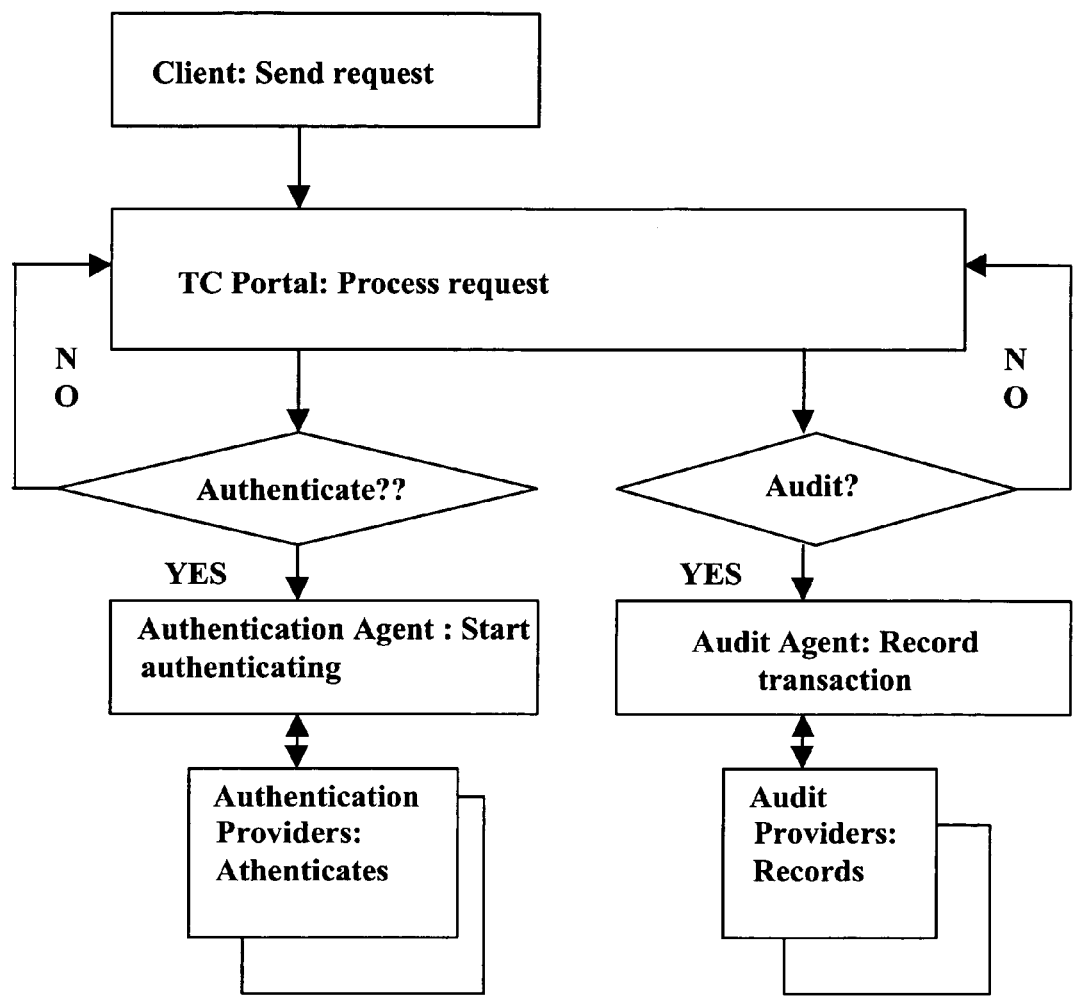
FIG. 15 is a flow chart of a normal PAMS workflow.

FIG. 15 shows a flow diagram of the normal PAMS workflow. After a request is successfully authenticated, a session token, a.k.a cookie, is generated and returned to client for subsequent access. The cookie is only valid within a fixed time frame and subject to certain pre-defined conditions, e.g. user logs out, that may invalidate it any time. The client uses the cookie to access resources as allowed without further need for authentication.

The entire authentication process is always monitored and logged by the audit agent. The audit agent, as instrumented by system policies, can also monitor certain events that happen later in the authenticated session. Events such as document signing will always be audited, unless explicitly disabled by the PAMS.

PAMS Usage Examples in XML

This section uses XML syntax exclusively to describe request/response interactions within PAMS. However, XML is not the only data transfer format in PAMS. ESIP-based exchange, for instance, is more suitable in cases where performance and programmatic flexibility are paramount. In fact, e-speak even allows a hybrid approach where the payload of a ESIP message can be XML data.

Vocabulary Definitions in e-speak Schemas

PAMS defines several custom vocabularies. Here they are defined in e-speak XML schemas, although they can be equivalently defined using J-ESI, e-speak's Java programming interface. For more details, see Chapter 14 of the e-speak Programmer's Guide.

Vocabularies in e-speak are Core-managed resources, and they are handled by e-Speak directly.

Persona Vocabulary

The following XML shows a sample request that creates a persona vocabulary:

```
<s:Envelope xmlns:s='http://schemas.xmlsoap.org/soap/envelope/'>
    <s:Header>
    <e:route xmlns:e='http://www.e-speak.net/schema/header'>
        <e:to encoding='ESURL'>esip://pams.com:2950/core/core/Service/
Create
        </e:to>
        <e:from encoding='ESURL'>esip://tcportal:2950/account/
administrator
        </e:from>
    </e:route>
    <e:context xmlns:e='http://www.e-speak.net/schema/header'>
        </e:sessionToken> . . . cookie . . . </e:sessionToken>
    </e:context>
    </s:Header>
    <s:Body>
        <service name="PAMS-Persona-Vocab" xmlns="http://www.e-speak.net/schema/core">
        <!--Attributes that describe persona vocabulary in e-speak's base vocabulary -->
        <description>
            <attr name="Name">
                <value>PAMS-Persona-Vocab</value>
            </attr>
            <attr name="Type">
                <value>Vocabulary</value>
            <attr name="Description">
                <value>PAMS persona vocabulary</value>
            </attr>
        </attr>
        </description>
        <schema name="PAMS-Agent-Vocab">
            <!---globally unique indentification -->
            <element name="Guid" type="String"/>
            <element name="EmployeeID" type="Integer"/>
            <element name="EmployeeType" type="String"/>
            <element name="Title" type="String"/>
            <element name="Address" type="String"/>
            <element name="AuthorizationLevel" type="short"/>
            <element name="AuthorizationAmount" type="double"/>
            <!---user's non-validated data -->
            <element name="userData" type="String"/>
        </schema>
        </service>
    </s:Body>
</s:Envelope>
```

Business Entity Vocabulary

The following XML shows a sample request that creates a business entity vocabulary:

```
<s:Envelope xmlns:s='http://schemas.xmlsoap.org/soap/envelope/'>
    <s:Header>
    <e:route xmlns:e='http://www.e-speak.net/schema/header'>
        <e:to encoding='ESURL'>esip://pams.com:2950/core/core/Service/
Create
```

-continued

```
        </e:to>
        <e:from encoding='ESURL'>esip://tcportal:2950/account/
administrator
        </e:from>
    </e:route>
    <e:context xmlns:e='http://www.e-speak.net/schema/header'>
        </e:sessionToken> . . . cookie . . . </e:sessionToken>
    </e:context>
    </s:Header>
    <s:Body>
        <service name="PAMS-BusinessEntity-Vocab"
xmlns="http://www.e-speak.net/schema/core">
        <!--Attributes that describe business entity vocabulary in e-speak's base vocabulary -->
        <description>
            <attr name="Name">
                <value> PAMS-BusinessEntity-Vocab</value>
            </attr>
            <attr name="Type">
                <value>Vocabulary</value>
            <attr name="Description">
                <value>PAMS business entity vocabulary</value>
            </attr>
        </attr>
        </description>
        <schema name="PAMS-BusinessEntity-Vocab">
            <element name="Address" type="String"/>
            <element name="ServiceDescription" type="String"/>
            <element name="DUNSNumber" type="String"/>
            <element name="SICCode" type="String"/>
            <! -- unique business entity identification →
            <element name="Guid" type="String"/>
        </schema>
        </service>
    </s:Body>
</s:Envelope>
```

Authentication Service Provider Vocabulary

The following sample request in XML creates the authentication service provider vocabulary:

```
<s:Envelope xmlns: s='http://schemas.xmlsoap.org/soap/envelope/'>
    <s:Header>
    <e:route xmlns:e='http://www.e-speak.net/schema/header'>
        <e:to encoding='ESURL'>esip://pams.com:2950/core/core/Service/
Create
        </e:to>
        <e:from encoding='ESURL'>esip://tcportal:2950/account/
administrator
        </e:from>
    </e:route>
    <e:context xmlns:e='http://www.e-speak.net/schema/header'>
        </e:sessionToken> . . . cookie . . . </e:sessionToken>
    </e:context>
    </s:Header>
    <s:Body>
        <service name="PAMS-AuthenticationProvider-Vocab"
xmlns="http://www.e-speak.net/schema/core">
        <!--Attributes that describe business entity vocabulary in e-speak's base vocabulary -->
        <description>
            <attr name="Name">
                <value>PAMS-AuthenticationProvider-Vocab</value>
            </attr>
            <attr name="Type">
                <value>Vocabulary</value>
            <attr name="Description">
                <value>PAMS authentication provider vocabulary</value>
            </attr>
        </attr>
        <description>
        <schema name="PAMS-AuthenticationProvider-Vocab">
            <element name="Address" type="String"/>
            <element name="ServiceDescription" type="String"/>
```

-continued

```
      <element name="ServiceLevel" type="String"/>
      <element name="Cost" type="float"/>
      <!--authentication method -->
      <element name="AuthMethod" type="String"/>
      <!--key length -->
      <element name="keyLength" type="Integer"/>
      <!-- identity of the service provider that determines its
      privileges -->
      <element name="IdentityDataEncoding" type="String"/>
      <element name="IdentityData" type="String"/>
      </schema>
    </service>
  </s:Body>
</s:Envelope>
```

Audit Service Provider Vocabulary

The following sample request in XML creates the audit service provider vocabulary:

```
<s:Envelope xmlns:s='http://schemas.xmlsoap.org/soap/envelope/'>
  <s:Header>
    <e:route xmlns:e='http://www.e-speak.net/schema/header'>
      <e:to encoding='ESURL'>esip://pams.com:2950/core/core/Service/
      Create
      </e:to>
      <e:from encoding='ESURL'>esip://tcportal:2950/account/
      administrator
      </e:from>
    </e:route>
    <e:context xmlns:e='http://www.e-speak.net/schema/header'>
      </e:sessionToken> . . . cookie . . . </e:sessionToken>
    </e:context>
  </s:Header>
  <s:Body>
    <service name="PAMS-AuditProvider-Vocab"
xmlns="http://www.e-speak.net/schema/core">
    <!--Attributes that describe business entity vocabulary in e-speak's
base vocabulary -->
      <description>
        <attr name="Name">
          <value>PAMS-AuditProvider-Vocab</value>
        </attr>
        <attr name="Type">
          <value>Vocabulary</value>
        <attr name="Description">
          <value>PAMS audit provider vocabulary</value>
        </attr>
      </attr>
      </description>
      <schema name="PAMS-AuditProvider-Vocab">
      <element name="Address" type="String"/>
      <element name="ServiceDescription" type="String"/>
      <element name="ServiceLevel" type="String"/>
      <element name="Cost" type="float"/>
      <!--audit method -->
      <element name="AuditMethod" type="String"/>
      <!-- identity of the service provider that determines its
      privileges -->
      <element name="IdentityDataEncoding" type="String"/>
      <element name="IdentityData" type="String"/>
      </schema>
    </service>
  </s:Body>
</s:Envelope>
```

Service Registration in PAMS

This section describes how PAMS service providers register their services.

Service Registration Example

The following XML request example shows how an authentication service registers using the pre-registered PAMS vocabulary. The request is processed by the service provider administration console.

The URL element within the service Data element indicates that this service is accessible through a URL link.

The following XML shows a sample request:

```
<? xml version='1.0' ?>
<s:Envelope xmlns:s='http://schemas.xmlsoap.org/soap/envelope/'>
  <s:Header>
    <e:route xmlns:e='http://www.e-speak.net/schema/header'>
      <e:to encoding='ESURL'>esip://pams.com:2950/core/core/Service/
      Create
      </e:to>
      <e:from encoding='ESURL'>esip://esportal.com:2950/account/
      testUser
      </e:from>
    /e:route>
      <e:context xmlns:e='http://www.e-speak.net/schema/header'>
        </e:sessionToken> . . . </e:sessionToken>
      </e:context>
  </s:Header>
  <s:Body>
    <service name="Cost-Effective-Authentication"
xmlns="http://www.e-speak.net/schema/core">
      <serviceData>
        <URL>http://www.cea.com/pams</URL>
      </serviceData>
      <description>
        <vocabulary>PAMS-AuthenticationProvider-Vocab</vocabulary>
        <attr name="Name">
          <value> Cost-Effective-Authentication </value>
        </attr>
        <attr name="ServiceDescription">
          <value>provides cost-effective authentication service</value>
        </attr>
        <attr name=" AuthMethod">
          <value> . . . </value>
        <attr name="ServiceLevel">
          <value>Full</value>
        </attr>
      </description>
    </service>
  </s:Body>
</s:Envelope>
```

Business Client Lookup

The following XML request example shows how business clients are located using the pre-registered PAMS vocabulary. Client lookups are handled by e-speak directly.

Client Lookup Example

The following XML shows a sample request that tries to locate clients:

```
<? xml version='1.0' ?>
<s:Envelope xmlns:s='http://schemas.xmlsoap.org/soap/envelope/'>
<s:Header>
<e:route xmlns:e='http://www.e-speak.net/schema/header'>
  <e:to encoding='ESURL'>esip://pams.com:2950/core/core/Service/
  Find
  </e:to>
  e:from encoding='ESURL'>esip://esportal.com:2950/account/
  testUser
  /e:from>
</e:route>
<e:context xmlns:e='http://www.e-speak.net/schema/header'>
  </e:sessionToken> . . . </e:sessionToken>
</e:context>
  </s:Header>
  <s:Body>
    <query>
      <result>$allInfo</result>
      <where>
```

```
        <vocabulary prefix="vocab"
        src="PAMS-BusinessEntity-Vocab"/>
        <condition>
           vocab:ServiceLevel = "Full"
        </condition>
      </where>
    </query>
  </s:Body>
</s:Envelope>
```

Business Client Registration

A business client or employee registers using the Persona vocabulary. Unlike the other examples shown, the resource handler for user registration is not initially part of e-speak Core; instead, it is handled by PAMSportal's user registration module, as indicated by the e:to attribute in example below. However, if some of the user registrations are to be discoverable through e-speak, then the registration module can internally register the entries with e-speak through the standard service registration mechanism.

Client Registration Example

```
<s:Envelope xmlns:s='http://schemas.xmlsoap.org/soap/envelope/'>
    <s:Header>
      <e:route xmlns:e='http://www.e-speak.net/schema/header'>
        <e:to encoding='ESURL'>esip://tcportal.com:2950/Service/
        Account/register
        </e:to>
        <e:from encoding='ESURL'>esip://tcportal:2950/account/user
        </e:from>
      </e:route>
      <e:context xmlns:e='http://www.e-speak.net/schema/header'>
        </e:sessionToken> . . . cookie . . . </e:sessionToken>
      </e:context>
    </s:Header>
    <s: Body>
      <service name="PAMS-Portal-User-Register"
xmlns="http://www.e-speak.net/schema/core">
        <!--Attributes that describe persona vocabulary in e-speak's base
        vocabulary -->
        <description>
          <vocabulary> PAMS-Persona-Vocab</vocabulary>
        </description>
        <attr name=>
          <attr name="EmployeeID">
            <value> 169 </value>
          </attr>
          <attr name="EmployeeType">
            <value> FT</value>
          </attr>
          <attr name="Title">
            <value>manager</value>
          </attr>
          <attr name="Address">
            <value>1000 Gateway Blvd., San Jose, CA</value>
          <attr>
          <attr name="AuthorizationLevel">
            <value>3</value>
          </attr>
          <attr name="AuthorizationAmount">
            <value>100000</value>
          </attr>
        <service>
      </s:Body>
</s:Envelope>
```

Register Agent Services

Both authentication and audit agents are registered with e-speak through the same XML template. Here is an instance of that template for the authentication agent service:

```
<? xml version='1.0' ?>
<s:Envelope xmlns:s='http://schemas.xmlsoap.org/soap/envelope/'>
    <s:Header>
        <e:route xmlns:e='http://www.e-speak.net/schema/header'>
            <e:to encoding='ESURL'>esip://pams.com:2950/core/core/Service/Create
            </e:to>
            <e:from encoding='ESURL'>esip://esportal.com:2950/account/administrator
            </e:from>
        </e:route>
        <e:context xmlns:e='http://www.e-speak.net/schema/header'>
            </e:sessionToken>...</e:sessionToken>
        </e:context>
    </s:Header>
    <s:Body>
        <service name="Authentication-Agent" xmlns="http://www.e-
speak.net/schema/core">
            <serviceData>
                <URL>http://www.cea.com/pams</URL>
            </serviceData>
            <description>
                <attr name="Name">
                    <value>Authentication-Agent</value>
                </attr>
                <attr name="ServiceDescription">
                    <value>PAMS's authentication agent service</value>
                </attr>
            </description>
        </service>
    </s:Body>
</s:Envelope>
```

PAMS System Setup and Configuration

The steps for system setup and configuration are as follows:
1. Install Hadware
2. Install Software
3. Start Software Services The hardware configuration is described in FIG. 14. PC's can be standard machines with 100 Meg of hard disk space and 32 Meg of memory. Windows 2000/95 are some of the operating systems that can be used. Servers can also be standard machines available from HP, Sun, etc., UNIX or Windows NT 4.0/SP4 are some of the operating systems that can be used. Servers should have a minimum of 100 Meg of disk space and 256M of memory.

Install Software

Arcot—Software setup

Arcot's WebFort comes with four setup programs for installing the WebFort components. Each of these components are required for configuring PAMS:
(a) Policy module—This component generates certificates for software smart cards using the Microsoft Certificate Server. Generation of certificates within the PAMS Authentication Agent is the default operating mode when an external Authentication Provider is not being utilized.
(b) Registration Authority—This system generates requests for certificates and sends them to the Certificate Authority. Also included is the personalization console, which is used to issue and manage software smart cards.
(c) Card Service—This program supports the activation of software smart cards and provides the ability for card roaming.
(d) Broadcast Service—The system is responsible for updating the authentication servers when software smart cards are revoked.

HP—Software Setup
(a) Obtain the latest version of the e-Speak software from the developers site.
(b) To install the Windows NT version, download file es_x0301.exe. This is a self-extracting zip file.
(c) In addition to the e-Speak code, the following software products are required:
  Oracle 8.0 for the backend database with thin client JDBC driver
  Java™ Servlet Development Kit (JSDK) 2.0, this is available at http://java.sun.com/products/servlet
  WebAccess solution Java Servlet Development Kit (JSDK) 2.0
  Apache web server and Apache Jserv
(d) e-Speak is then configured for the NT environment. This process is explained in the e-Speak implementation guide page 14.

Start Software Service
1. Start Arcot WebFort. Webfort services are straight forward and are explained in the WebFort manual. For example, if WebFort is loaded on a Windows NT environment, WebFort services would be started using the Services Utility of the Control Panel. The Services Utility will list the Authentication service, and the Broadcast service. Click 'Start' to initiate services. The personalization console and the server management console are started from the NT Start Menu.
2. Start HP e-Speak. Starting e-Speak can be done by changing to the <installDir> and entering '.\espeak' to start the e-Speak core and basic services.

Start Agent Services

The system is started by the following steps:
1. Star the e-Speak core.
2. Create and register PAMS vocabularies.
3. Register PAMS Agents
4. Register PAMS service providers as e_Speak services.

In the second step, the PAMS agents also register the default authentication and audit service handlers with e-Speak. Since these agents are system default, they can simply be called by name by other PAMS portal modules.

Once a vocabulary has been created, the implementation of the service interface is created. Specific instructions on creation of the interface can be obtained from the current version of the e-Speak manual. The following steps are indicative of the steps involved.
1. Define the interface that describes the Arcot API's so that it conforms to e_Speak IDL.
2. Create a new ESServiceElement. Set the value of the vocabulary attributes and provide the implementation to the service element. The service is then registered and started so that the service can be found and utilized by others. This is done by connecting to the e_Speak core (as prevously done) and then creating the PAMS agent service. Each service is defined by creating a file 'PAMSAgent.xml' to register the service. PAMAgent.xml has beeb previously presented in the section entitled "Register Agent Services".
3. Indicative steps to create and deploy the PAMS Agent service:
  java PAMSAuthAgentService PAMSAgentVocabulary.xml
4. PAMSAuthAgentServicejava registers the service:
  ESConnection session=new ESConnection(PropertyFile1");
5. The service element is created and an implementation object is associated with it:
  ESServiceElement servElem=new ESServiceElement (session, essd); servElem.setImplementation(new PAMSAuthAgentServiceImp( );
6. The service is registered
  ESAccessor accessor=servElem.register( ); (refer to prior section entitled "Register Agent Services" for an equivalent registration done in XML)
7. The service is advertised to the core(s):
  servElem.advertise( );
8. The service is started:
  servElem.start( );

Register PAMS Vocabularies

See prior vocabulary definitions in XML format. Each XML vocabulary can be registered simply by sending the request through the Webaccess component of e-speak.

Register PAMS Service Providers

This is done by PAMS's administration console. The procedure will be different depending on whether the service provider is internal or external. Internal service provider comes with a service description file describing full details of the service. The console picks up the configuration file for registration. External service provider, on the other hand, is typically discovered through e-speak's advertising service. In the case where the service' ESURL is known, the discovery step can be skipped, and the console can connect to the service directly through e-speak. Although the present invention has been described in considerable detail with reference to certain preferred versions thereof, other versions are possible. Therefore the spirit and scope of the appended claims should not be limited to the preferred versions herein.

What is claimed is:

1. A method for conducting authenticated business transactions involving communications using microprocessor equipped devices to communicate over a distributed network, the method being carried out by an on-line authentication service available on the distributed network, comprising the acts of:
  a) enrolling a multiplicity of users with a closed authentication infrastructure, wherein enrolling comprises obtaining and verifying the identity and other credentials of the multiplicity of users and providing each user with a unique secret necessary for later authentication to said on-line authentication service and storing the verified identity and other credentials in at least one database;
  b) authenticating a plurality of the multiplicity of users to said on-line authentication service using each user's unique secret to produce a plurality of authenticated users;
  c) enabling a plurality of groups each group comprising at least two of said plurality of authenticated users to conduct interactions comprising a plurality of messages under persistent mediation of said on-line authentication service, such that each of the plurality of messages passes through said on-line authentication service and is directly monitored by said on-line authentication service;
  d) wherein persistent mediation of an interaction further comprises the acts of directly compiling an audit trail of an interaction and making the audit trail available to the at least two users in the interaction in an intelligible form at any time during the interaction at the option of the at least two users, and wherein the audit trail comprises at least some of the content of the plurality of messages in the interaction; and
  e) further comprising the act of providing a discovery portal available to authenticated users through the on-line authentication service such that users can search for other users based on their verified and dynamically variable credentials, whereby users may conduct authenticated interactions with each other without having a prior relationship.

2. The method of claim 1, wherein the method further comprises the act of enabling the plurality of authenticated users to interact with each other in collaboration groups through the on-line authentication service when a collaboration group comprises at least two users each using a browser operated computing device.

3. The method of claim 2 wherein the act of enabling the plurality of authenticated users to interact with each other in collaboration groups further comprises enabling the at least two users in a collaboration group to make a selection during the interaction of at least part of the audit trail for archival by the on-line authentication service such that it will be held under the control of the on-line authentication service for access by any of the at least two users in the interaction after the interaction is complete.

4. The method of claim 2, wherein the collaboration group comprising at least two users each using a browser operated computing devise comprises greater than two users each using a browser operated computer device.

5. The method of claim 1, further comprising the act of accepting dynamically variable credentials from at least some of the plurality of authenticated users, and wherein the act of providing a discovery portal further comprises the act of providing the plurality of users with the capability of searching for other users based on dynamically variable credentials.

6. A method for conducting authenticated business transactions involving communications using microprocessor equipped devices to communicate over a distributed network, the method being carried out by an on-line persistent authentication and mediation service available on the distributed network, comprising the acts of:
  a) enrolling users seeking enrollment in the persistent authentication and mediation service, to produce a multiplicity of enrolled users, wherein enrolling comprises obtaining and verifying the identity and other credentials of the multiplicity of users and providing each user with a unique secret necessary for later authentication to said on-line persistent authentication and mediation service;
  b) storing the verified identity and other credentials in at-least one database;
  c) receiving on-line requests from enrolled users for authentication to the on-line authentication service;
  d) authenticating enrolled users seeking authentication to the persistent authentication and mediation service using each enrolled user's unique secret, so as to maintain a plurality of authenticated users;
  e) receiving requests from authenticated users to be connected to particular other authenticated users;
  f) connecting groups of at least two authenticated users under persistent mediation of the persistent authentication and mediation service and enabling the at least two authenticated users which are connected to conduct an interaction comprising a plurality of messages;
  g) repeating act (f) to produce a plurality of groups of connected users;
  h) mediating the interaction among the at least two users of each of said plurality of groups of connected users such that each message in the interaction passes through the persistent authentication and mediation service;
  i) directly compiling an audit trail of the interaction and making information from the audit trail available to the at least two users of each group of connected users in intelligible form during the interaction and
  j) wherein the act of enrolling users seeking enrollment in the persistent authentication and mediation service comprises the acts of:
    i) distributing software to a user seeking enrollment which enables microprocessor equipped devices operated by the user seeking enrollment to interact with said persistent authentication and mediation service;
    ii) generating a unique private key, and a unique public key for the user seeking enrollment;
    iii) obtaining permanent credentials particular to each of the users seeking enrollment, said credentials comprising public permanent credentials and secret permanent credentials;
    iv) deciding whether to approve the applicant seeking enrollment;
    v) distributing the unique secret comprising the unique private key in the form of a camouflaged private encryption key to the user seeking enrollment if the user seeking enrollment is approved, wherein the private encryption key is camouflaged in a software container, whereby the user's camouflaged private encryption key will generate a correct response to an authentication challenge if a proper access code is entered, but often generates an incorrect but plausible response if an improper access code is entered, whereby if an incorrect response is used notice will be provided to the on-line persistent authentication and mediation service of a security attack;

vi) distributing the unique public key to the user, wherein said unique public key is in a form which can only be decrypted with a key held under exclusive control of the persistent authentication and mediation service, whereby the persistent authentication and mediation service acts as a closed authentication infrastructure;

vii) storing said permanent credentials in a customer database, said customer database being accessible to said persistent authentication and mediation service, whereby the user seeking enrollment becomes one of said multiplicity of enrolled users; and viii) repeating steps 1) through vii) for each applicant seeking enrollment.

7. The method of claim 6 wherein the act of authenticating enrolled users seeking authentication to the persistent authentication and mediation service comprises the acts of:

a) generating a challenge message and sending it over the public network to an enrolled user seeking authentication, b) receiving a response to the challenge from the user seeking authentication, said response comprising an encrypted message and the encrypted unique public key of the enrolled user seeking authentication, c) verifying the authenticity of the response to the challenge, the act of verifying the authenticity comprising the act of decrypting the unique public key and then decrypting the response using the unique public key of the enrolled user seeking authentication to produce a decrypted response, d) authenticating the enrolled user seeking authentication if the decrypted response indicates that the response was authentic, whereby the enrolled user seeking authentication becomes an authenticated user, e) rejecting the user if the decrypted response indicates that the response was not authentic, and f) repeating steps (a) through (e) for each enrolled user seeking authentication.

8. The method of claim 7 further comprising the acts of:

a) allowing authenticated users to optionally submit variable credentials;

b) receiving variable credentials submitted by authenticated users;

c) storing the variable credentials in the customer database according to user;

d) providing authenticated users discovery software, whereby authenticated users may dynamically discover enrolled users according to search criteria; and e) granting authenticated users access to search the public permanent credentials and the variable credentials in the customer database, using said discovery software.

9. The method of claim 8 further comprising making available collaboration software to each of said plurality of groups of connected users is to facilitate communication among the at least two authenticated users of each group, wherein said collaboration software makes information from the audit trail available to each of said at least two authenticated users of each of said plurality of groups of connected users.

10. The method of claim 9 wherein:

a) the unique secret comprises a cryptographically camouflaged private key in a software container;

b) wherein the unique public key is encrypted with a key held under the exclusive control of the persistent authentication and mediation service and stored in a digital certificate; and c) wherein the act of authenticating an enrolled user to the persistent authentication and mediation service further comprises the act of decrypting the encrypted unique public key unique to the enrolled user prior to decrypting the response.

11. The method of claim 8 wherein the persistent authentication and mediation service is provided by at least one host site connected to the distributed network, said at least one host site comprising at least one computer server operated by an open software platform providing intelligent interactions, wherein the operation of the persistent authentication and mediation service is implemented by software operating on the open software platform.

12. The method of claim 11 wherein interactions between users and the persistent authentication and mediation service are mediated through the open software platform.

13. The method of claim 12 wherein some of the plurality of groups of connected users comprise at least three authenticated users.

14. The method of claim 13 wherein some of the plurality of groups of at least three connected users comprise users of different types.

15. The method of claim 12 wherein the distributed network is the public Internet.

16. An online service for conducting business transactions among microprocessor equipped devices over a distributed network, the online service comprising:

a) a host site connected to the network, the host site comprising an open software platform providing intelligent interactions;

b) a persistent authentication and mediation service, the persistent authentication and mediation service comprising a software PKI authentication agent operating on said open software platform such that communications over the network by said persistent authentication and mediation service are mediated by said open software platform;

c) a customer database comprising permanent credentials and dynamically variable information corresponding to users of the online service and a database manager for managing the customer database;

d) software operating on said open software platform which performs at least the following functions;

i) enrolling users seeking enrollment in the persistent authentication and mediation service to produce enrolled users;

ii) storing credentials corresponding to enrolled users in the customer database;

iii) authenticating enrolled users seeking authentication to the persistent authentication and mediation service to produce authenticated users;

iv) allowing authenticated users to discover enrolled users according to search criteria;

v) allowing authenticated users to be connected under mediation of the persistent authentication and mediation service through the open software platform;

vi) allowing collaboration between authenticated users which have been connected; and vii) memorializing transactions between authenticated users.

17. The online service defined in claim 16 where the function of enrolling users seeking enrollment in the persistent authentication and mediation service comprises the functions of:
   a) distributing software to a user seeking enrollment which enables microprocessor equipped devices operated by the user seeking enrollment to interact with the persistent authentication and mediation service,
   b) generating a unique private key, and a unique public key for the user seeking enrollment,
   c) obtaining permanent credentials particular to each of the users seeking enrollment, said credentials comprising public permanent credentials and secret permanent credentials,
   d) deciding whether to approve the applicant seeking enrollment,
   e) distributing the unique public key and the unique private key to the user seeking enrollment if the user seeking enrollment is approved,
   f) storing said permanent credentials in a customer database, said customer database being accessible to said persistent authentication and mediation service, whereby the user seeking enrollment becomes one of a multiplicity of enrolled users, and
   g) repeating steps (a) through (f) for each applicant seeking enrollment.

18. The online service defined in claim 17 wherein the function of authenticating enrolled users seeking authentication to the persistent authentication and mediation service comprises the functions of:
   a) generating a challenge message from the persistent authentication and mediation service and sending it over the public network to an enrolled user seeking authentication,
   b) receiving a response to the challenge from the user seeking authentication, said response comprising an encrypted message and the unique public key unique to the enrolled user seeking authentication,
   c) verifying the authenticity of the response to the challenge, the act of verifying the authenticity comprising the act of decrypting the response using the public key unique to the enrolled user seeking authentication to produce a decrypted response,
   d) authenticating the enrolled user seeking authentication if the decrypted response indicates that the response was authentic, whereby the enrolled user seeking authentication becomes an authenticated user,
   e) rejecting the user if the decrypted response indicates that the response was not authentic, and
   f) repeating steps (a) through (e) for each enrolled user seeking authentication.

19. The online service defined in claim 18 wherein:
   a) the software PKI authentication agent is a pseudo-PKI system of the type which cryptographically camouflages each of the unique private keys in a software container,
   b) wherein each of the unique public keys is encrypted in a form recognizable to the pseudo-PKI authentication agent and stored in a digital certificate, and
   c) wherein the function of authenticating an enrolled user to the persistent authentication and mediation service further comprises the function of decrypting the encrypted unique public key unique to the enrolled user prior to decrypting the response.

20. The online service defined in claim 16 wherein the distributed network is the public Internet.

21. A system for conducting business transactions over a distributed network, the system comprising:
   a) a persistent authentication and mediation service site providing a persistent authentication and mediation service, said site connected to the public network, said site comprising
      i) an open software platform application providing intelligent interactions said platform application mediating all interactions of said persistent authentication and mediation service site via said public network,
      ii) an authentication agent application comprising a software pseudo-PKI authentication application operating on said open software platform application, said authentication agent application comprising software which enrolls new business users producing enrolled users and authenticates the enrolled users producing authenticated business users,
      iii) an audit agent application operating on said open software platform which logs and monitors interactions mediated by the open software platform, whereby every interaction among authenticated business users passes through the open software platform and is monitored by the audit agent,
      iv) a discovery software application operating on said open software platform such that said discovery software agent operates to enable authenticated business users to search for other users based on their credentials, and
      v) a collaboration software application operating on said open software wherein said collaboration software application enables groups of at least two authenticated business users to communicate under direct mediation of the audit agent and to access audit information in an intelligible form during an interaction;
   b) a multiplicity of user sites operated by the enrolled users, the user sites being connected to the public network, each site operating at least one computer application whereby it may interact with other business users and each site further comprising software which allows interaction with the persistent authentication and mediation service, a software camouflaged private key, and a digital certificate, said digital certificate comprising an encrypted pseudo-public key encrypted with a key which is under exclusive control of said persistent authentication and mediation service, wherein said camouflaged private key will generate a proper response to a challenge from the persistent authentication and mediation service if a correct access code is entered and may generate plausible but improper responses if incorrect access codes are entered, whereby if an incorrect response is used the persistent authentication and mediation service will be alerted to a security attack on the camouflaged private key, and
   c) a database of authentication information and credentials pertaining to the enrolled business users of said persistent authentication and mediation service, the database accessible to the authentication agent application and the discovery application.

22. The system defined in claim 21 further comprising a plurality of authentication provider applications accessible by the authentication agent application.

23. The system defined in claim 21 wherein at least one authentication provider application is located at a different site than the persistent authentication and mediation service site.

24. The system defined in claim 21 further comprising a plurality of audit provider applications accessible by the audit agent application.

25. The system defined in claim 21 wherein at least one authentication application provider is located at a different site than the persistent authentication and mediation service site.

26. The system defined in claim 21 wherein the network is the public Internet.

27. The system defined in claim 21, wherein the user sites comprise sites which are chosen from the group consisting of user sites which access the network via a browser operating on a computer, mobile telephonic devices which access the network, world wide web sites, and sites comprising applications without a user interface.

28. An apparatus for providing a service for conducting authenticated business transactions involving a multiplicity of users over a distributed network, the apparatus comprising:
   a) at least one application server connected to the public network, the at least one application server having a computer processor and a computer readable memory, the memory storing the software to implement the service, the software comprising
      i) an open software platform providing intelligent interactions;
      ii) a software pseudo-PKI authentication agent application, operating on said open software platform;
      iii) a discovery software application, operating on said open software platform; and
      iv) a collaboration software application, operating on said open software platform;
   b) at least one database server, the at least one database server comprising a business users database, the business users database comprising
      i) authenticated data about registered business users, said authenticated data being protected from user modification;
      ii) data pertaining to registered business users which is dynamically modifiable by said business users; and
      iii) data needed for linking business users;
      whereby the application server facilitates authenticated interactions between business users, including the ability to access other authenticated users without repeated logging in, the ability to dynamically search for authenticated users according to user defined specifications, and accomplish peer to peer collaboration.

29. The apparatus as defined in claim 28 where the distributed network is the public Internet.

* * * * *